United States Patent [19]
Siklos et al.

[11] 3,764,972
[45] Oct. 9, 1973

[54] CENTRAL TRAFFIC SIGNAL CONTROL

[75] Inventors: Gregory Siklos, Bronx; James B. Rudden, New York, both of N.Y.

[73] Assignee: The Marbelite Company, Inc., Brooklyn, N.Y.

[22] Filed: Mar. 2, 1971

[21] Appl. No.: 120,254

Related U.S. Application Data

[63] Continuation-in-part of Ser. No. 878,762, Nov. 21, 1969, Pat. No. 3,670,302.

[52] U.S. Cl. .................................................. 340/35
[51] Int. Cl. ............................................. G08g 1/08
[58] Field of Search ................................. 340/35, 40

[56] References Cited
UNITED STATES PATENTS
3,528,054  9/1970  Auer et al. ............................ 340/35

*Primary Examiner*—William C. Cooper
*Attorney*—Wolf, Greenfield & Sacks

[57] ABSTRACT

There is disclosed a central control station and a plurality of local stations each including a signal controller responsive to commands from the central control station for controlling the signal lights at each local station. A computer at a central control station monitors changes in traffic trends and can send a signal to a local station to control the signal controller sequence at any intersection with an appropriate offset between intersections. The system smoothly changes from local (isolated) operation to remote (computer control) operation without adversely effecting traffic flow. The central control station includes a slave driver associated with each local station. Each slave driver is connected over a two-wire telephone type line to a corresponding slave unit which in turn is coupled to the signal controller associated with that local station. In a non-actuated system with the signal controller of the local station at its rest or dwell position, the computer can issue a hold command that is transmitted by the slave driver over the two-wire line to the slave unit. This command changes control from local to remote. Thereafter, the computer may issue an advance command that moves the signal controller to its next position. The advancement of the controller is sensed by the slave unit which in turn transmits a status command to the slave driver and thence to the computer indicating that the controller did, in fact, advance. If no status command is received the intersection is dropped by the computer and returns to local operation.

18 Claims, 15 Drawing Figures

FIG. 3B
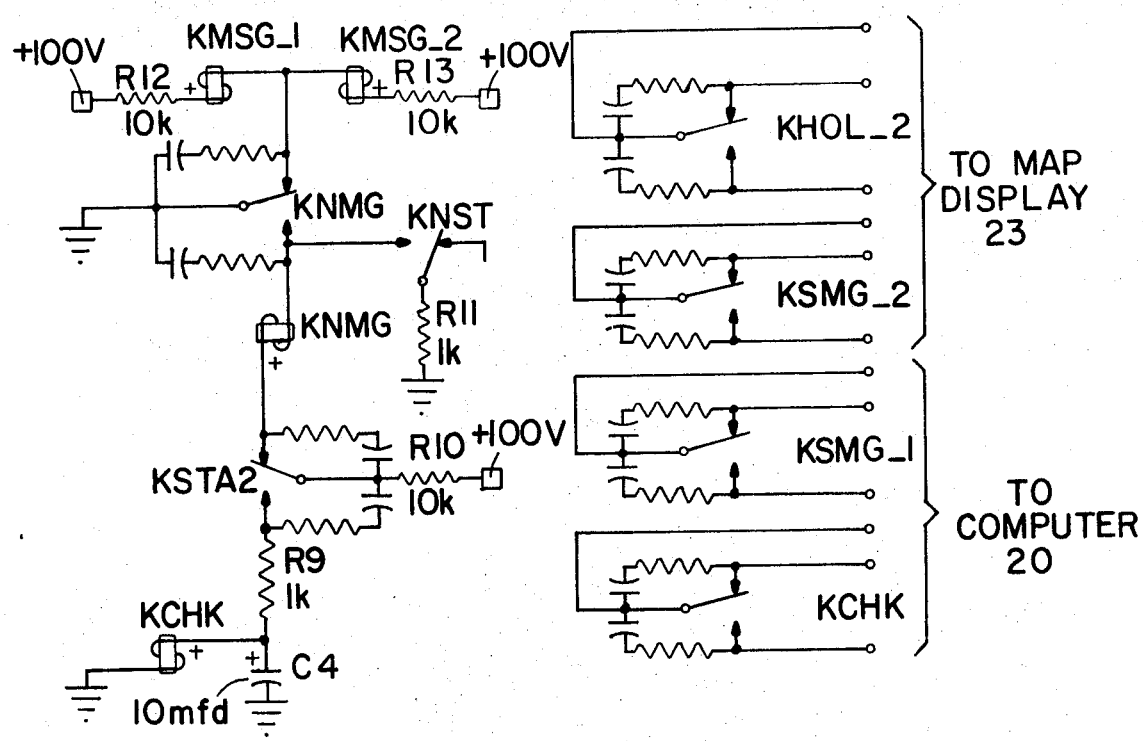
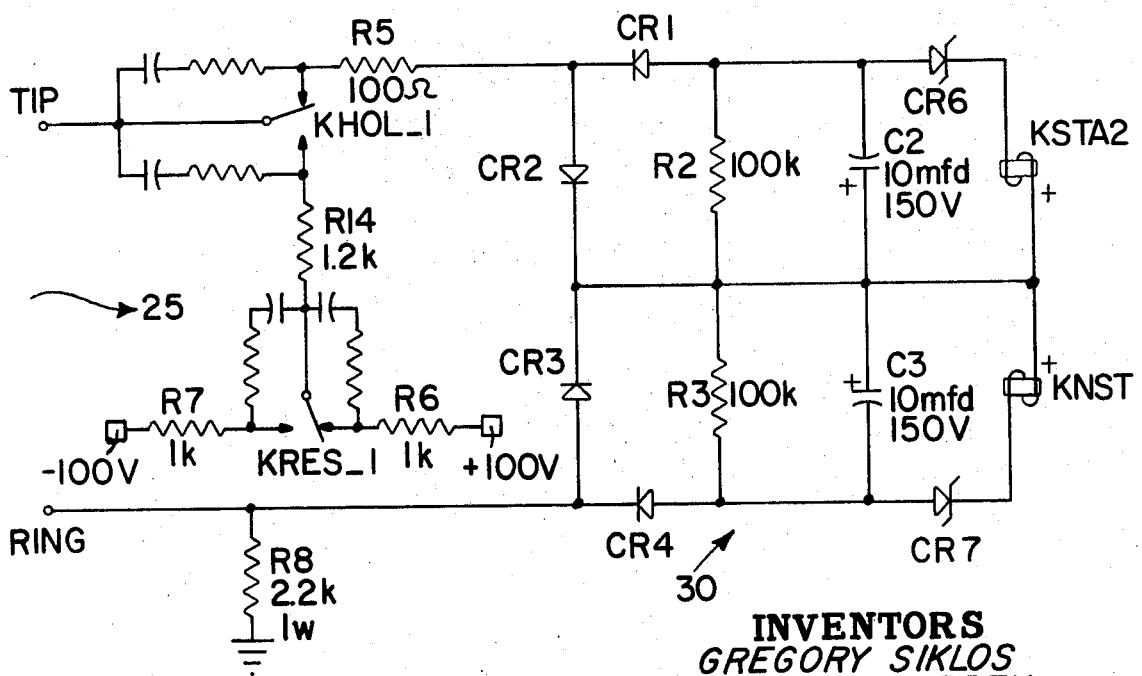

INVENTORS
GREGORY SIKLOS
JAMES B. RUDDEN

BY

WOLF, GREENFIELD & SACKS

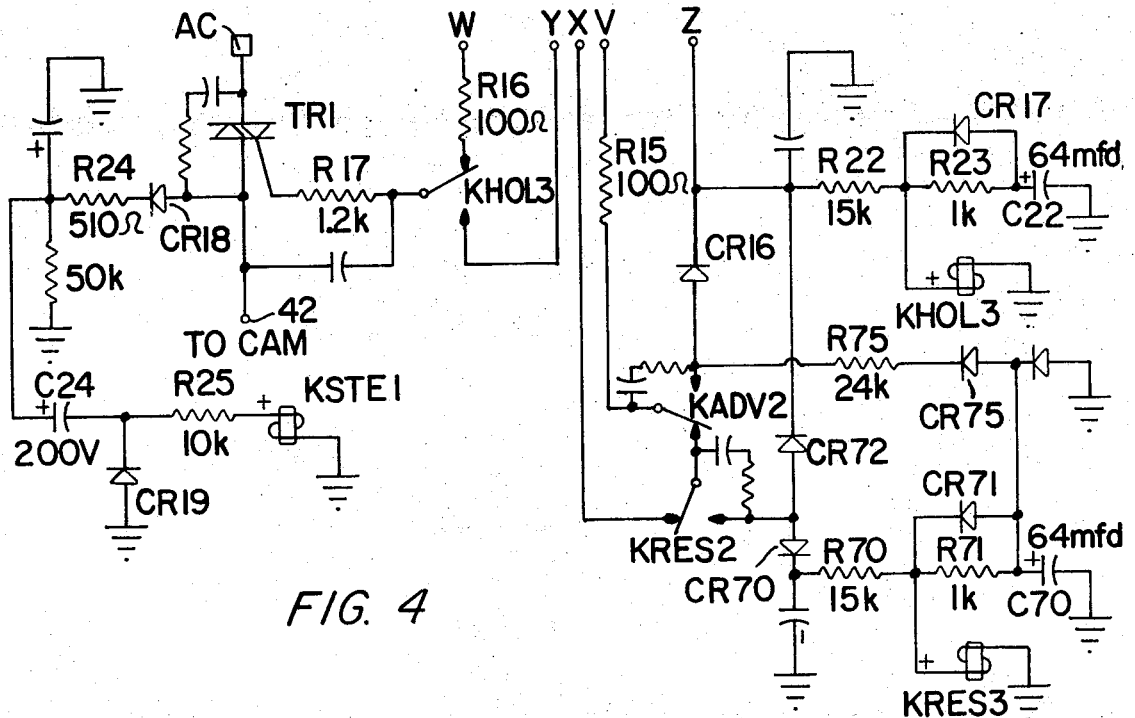
FIG. 4
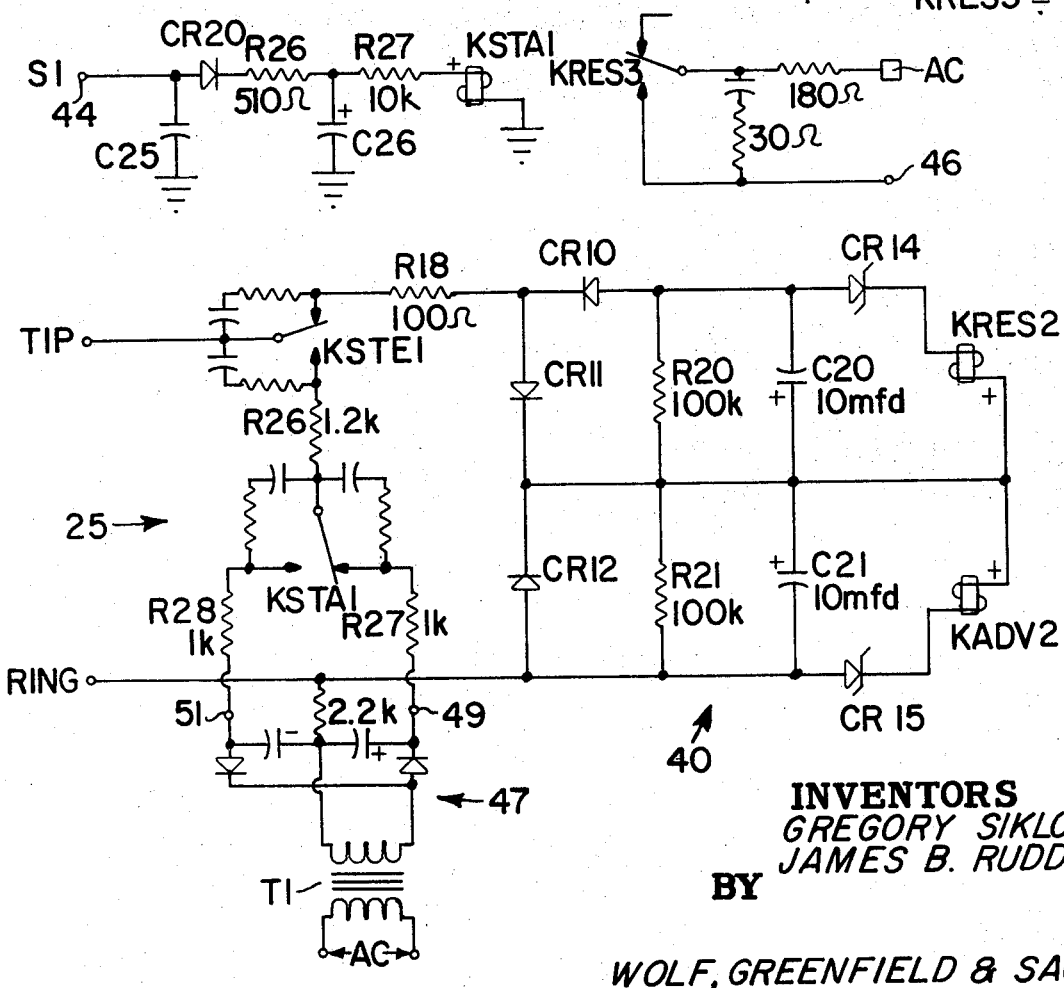
INVENTORS
GREGORY SIKLOS
JAMES B. RUDDEN
BY
WOLF, GREENFIELD & SACKS

| | G1 | Y1 | R1 | G2 | Y2 | R2 | W1 | FDW | DW | W2 | FDW | DW | S1 | S2 | S3 | S4 | |
|---|---|---|---|---|---|---|---|---|---|---|---|---|---|---|---|---|---|
| INTERLOCK | PHASE A VEHICLE | | | PHASE B VEHICLE | | | PHASE A PEDESTRIAN | | | PHASE B PEDESTRIAN | | | STATUS | | DWELL MASK MEMORY | | |
| 1 | X | | | | | X | X | | | | | | X | X | | | ØA INTERLOCK |
| 2 X | X | | | | | X | | X | | | | | X | | | | ØA PEDESTRIAN CLEARANCE |
| 3 X | | X | | | | X | | | X | | | | X | | | | ØA VEHICLE CLEARANCE |
| 4 X | | | X | | | X | | | X | | | | X | | | | ØA RED CLEARANCE |
| 5 X | | | X | X | | | | | | X | X | | | | | | ØB GREEN PLUS MASK |
| 6 X | | | X | X | | | | | X | | | X | | | | | B PED CLEAR BEFORE MEMORY |
| 7 X | | | X | X | | | | | X | | | X | | | | X | B PED CLEAR WITH MEMORY |
| 8 X | | | X | | X | | | | X | | | | X | | | X | ØB VEHICLE CLEARANCE |
| 9 X | | | X | | | X | | | X | | | | X | X | | X | ØB RED CLEARANCE |
| 10 X | X | | | | | X | X | | | | | | X | X | X | X | ØA GREEN PLUS WALK |
| 11 X | X | | | | | X | X | | | | | | X | X | | X | SKIP |
| 12 X | X | | | | | X | X | | | | | | X | X | | X | SKIP |
| 13 X | X | | | | | X | X | | | | | | X | X | | X | SKIP |
| 14 X | X | | | | | X | X | | | | | | X | X | | X | SKIP |
| 15 X | X | | | | | X | X | | | | | | X | X | | X | SKIP |
| 16 X | X | | | | | X | X | | | | | | X | X | X | X | ØA DWELL |

FIG. 6

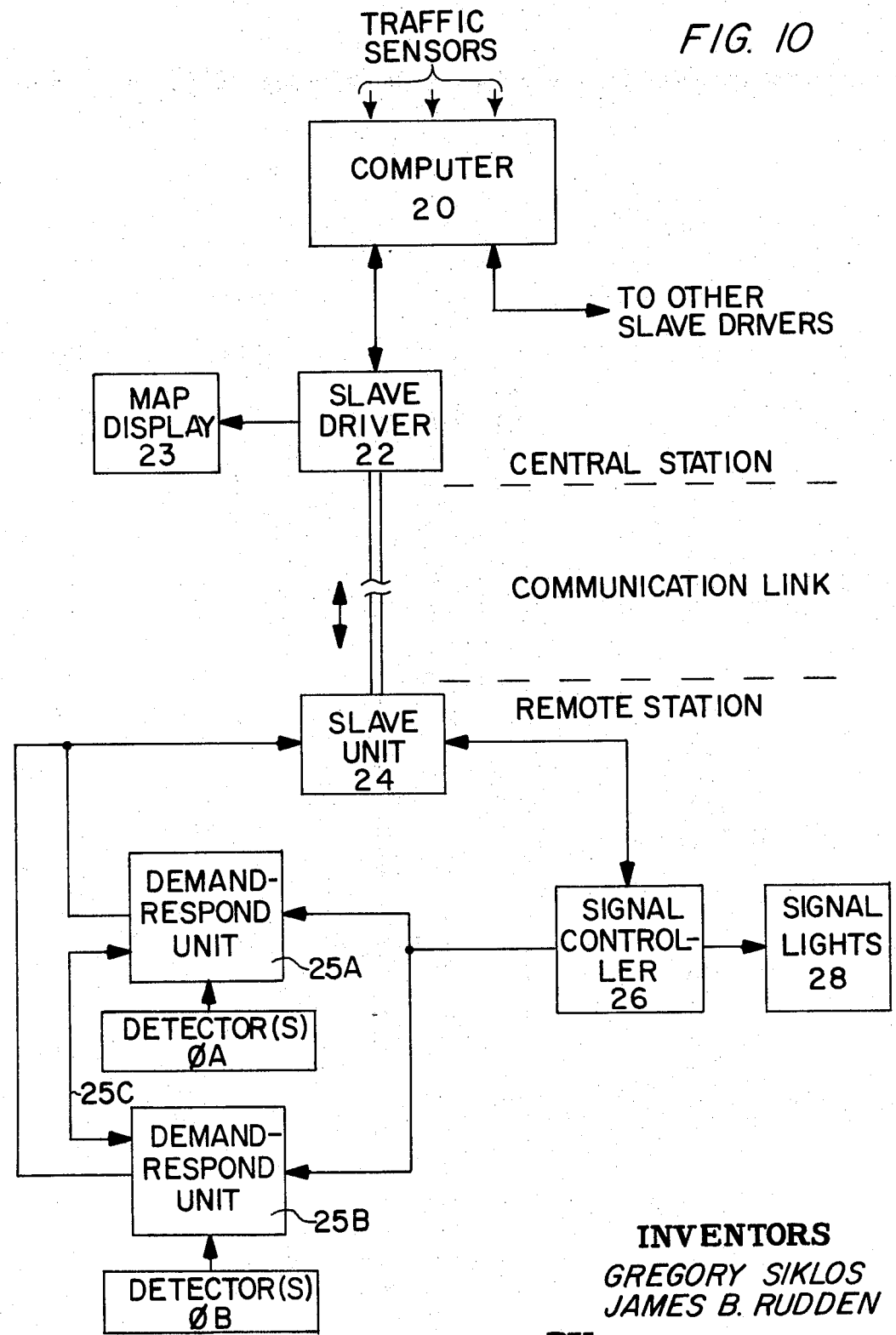

FIG. 12

| # | INTERLOCK | G1 | Y1 | R1 | G2 | Y2 | R2 | W1 | FDW | DW | W2 | FDW | DW | S1 | S2 | S3 | |
|---|---|---|---|---|---|---|---|---|---|---|---|---|---|---|---|---|---|
| 1 |   | X |   |   |   |   | X | X |   |   |   |   |   | X | X |   | ØA INTERLOCK |
| 2 | X | X |   |   |   |   | X |   | X |   |   |   |   | X |   |   | ØA PEDESTRIAN CLEAR |
| 3 | X |   | X |   |   |   | X |   |   | X |   |   |   | X |   |   | ØA VEHICLE CLEAR |
| 4 | X |   |   | X |   |   | X |   |   | X |   |   |   | X |   |   | ØA RED CLEAR |
| 5 | X |   |   |   | X | X |   |   |   | X | X |   |   |   |   |   | ØB GREEN PLUS WALK |
| 6 | X |   |   |   | X | X |   |   |   | X |   | X |   |   |   |   | ØB PEDESTRIAN CLEAR |
| 7 | X |   |   |   | X | X |   |   |   | X |   |   |   | X | X |   | ØB EXTENSION PORTION |
| 8 | X |   |   |   | X | X |   |   |   | X |   |   |   | X |   |   | ØB VEHICLE CLEAR |
| 9 | X |   |   |   |   | X |   | X |   |   |   | X |   | X | X |   | ØB RED CLEAR |
| 10 | X | X |   |   |   |   | X | X |   |   |   |   |   | X | X |   | X | ØA GREEN PLUS WALK |
| 11 | X | X |   |   |   |   | X | X |   |   |   |   |   | X | X |   | SKIP |
| 12 | X | X |   |   |   |   | X | X |   |   |   |   |   | X | X |   | SKIP |
| 13 | X | X |   |   |   |   | X | X |   |   |   |   |   | X | X |   | SKIP |
| 14 | X | X |   |   |   |   | X | X |   |   |   |   |   | X | X |   | SKIP |
| 15 | X | X |   |   |   |   | X | X |   |   |   |   |   | X | X |   | SKIP |
| 16 | X | X |   |   |   |   | X | X |   |   |   |   |   | X | X | X | X | ØA DWELL |

Column groups: INTERLOCK | PHASE A VEHICLE (G1 Y1 R1) | PHASE B VEHICLE (G2 Y2 R2) | PHASE A PED. (W1 FDW DW) | PHASE B PED. (W2 FDW DW) | STATUS DWELL EXT. MASK (S1 S2 S3)

CENTRAL TRAFFIC SIGNAL CONTROL

RELATED APPLICATION

This application is a continuation-in-part of copending application Ser. No. 878,762, filed Nov. 21, 1969, now U.S. Pat. No. 3,670,302.

FIELD OF INVENTION

The present invention relates in general to a traffic control system comprising a central control station and a plurality of local stations each including a signal controller for controlling signal lights associated with a traffic intersection. A computer at the central control station is capable of transferring control between local operation and computer controlled operation. More particularly, the present invention relates to a computerized traffic signal control system that employs a two-wire telephone-type line between the central station and each remote station for sending control commands to the local station and receiving status commands over the same two-wire line from the local station when the local signal controller has advanced.

BACKGROUND OF THE INVENTION

In recent times the computer has played a more active role in controlling traffic movement, particularly in congested urban areas. These computer systems are generally responsive to changes in traffic volume, traffic density and traffic flow to provide different offset cycles and time splits for progressive intersections to thereby provide smooth traffic flow. In a non-actuated system a two-wire communication link has been used to send and receive commands from a central station to a remote station. Usually a separate two-wire line is used for each such remote station. However, in a semi-actuated system for an intersection including a number of lanes, additional wires have been necessary to communicate between the central station and the local station. This is due at least in part to the fact that a plurality of separate detections have been stored by the computer in order to effectively control each intersection.

OBJECTIVES

It is one objective of the present invention to provide a traffic control system comprising a central control station and a plurality of remote stations wherein a two-wire telephone type line connects from the central station to each remote station, wherin the system is adapted to cause advancement of the local signal controller and the central station is adapted to receive status signals from the remote station indicative of the advancement of the controller. Another objective of the present invention is to provide a traffic control system comprising a computer located at the central station and a detection responsive means coupled to each signal controller which is responsive to detections associated with the controller's intersection to cause selective advancement of the local controller. Still another objective of the invention is to provide a traffic control system in accordance with the preceding objects wherein no more than one two-wire line couples the central station to each local station regardless of the number of local detectors and detection responsive means are associated with each local station.

THE INVENTION

According to the invention, the traffic control system comprises a central control station and at least one local station including a traffic signal controller for controlling the traffic intersection. A two-wire telephone-type transmission line intercouples the central control station and each local station. The central control station comprises circuit means for selectively impressing a first signal level on the two-wire line when the central station decides to control the operation at the local station. This circuit means may under computer control selectively impress a second signal level on the two-wire line for a predetermined duration when the central control station decides to advance the signal controller at the local station. The local station also includes circuit means which respond to the first signal level for selectively rendering the local station responsive to the second signal level, and means thereafter responsive to the second signal for advancing the local signal controller. In addition, the local station includes status means responsive to the advance of the signal controller for generating a status signal during the predetermined duration of the second signal on the two-wire line. The central control station includes status receiving means for detecting the status signal.

In accordance with another aspect of the invention one or more vehicle detectors are located at each local intersection to provide semi-actuated or fully-actuated operation. One or more detection responsive means couple to the vehicle detectors, the circuit means of the local station and the local signal controller, and include a vehicle memory actuable from the vehicle detector. In the following exposition the detection responsive means is illustratively depicted by the demand respond unit. Each detection responsive means comprises a circuit means for controlling the advancing of the controller coupled to the means for advancing and the vehicle memory, and adapted to selectively inhibit the advancing means during a rest or dwell interval of the controller when no vehicles have been detected. A subsequent vehicle detection would allow the controller to advance.

In accordance with another aspect of the invention, a second embodiment of a detection responsive means is shown. This embodiment is responsive to phase B detections, for example, when the controller is in the phase A dwell interval to cause the controller to step. Furthermore, the detection responsive means is responsive to continued phase B detections, occuring at a high enough frequency, when the controller is in the phase B extension interval to prevent the controller from stepping out of this phase B extension interval.

A pair of detection responsive means may also be used at a local station, one associated with the phase A detector or detectors and the other associated with the phase B detector or detectors. With this type of arrangement the controller stays in either dwell interval awaiting a detection on an opposing phase. During an extension interval of either phase continued detections on the phase of interest would extend the extension interval.

The present invention also provides timing circuitry at each detection responsive means for detecting an extended force-off signal (this is actually an extended advance pulse in one embodiment) and forcing the controller out of the phase A dwell interval, for example, even though no detection occurred on phase B.

Numerous other objects, features and advantages of the invention should now become apparent upon a

BRIEF DESCRIPTION OF DRAWINGS

FIGS. 3A and 3B are a circuit diagram of a slave driver;

FIG. 4 is a circuit diagram of a slave unit;

FIG. 6 is an interval diagram showing controller signals for non-actuated and semi-actuated operation;

FIG. 10 is a circuit diagram of another embodiment of a demand-respond unit used in the block diagram of FIG. 7;

FIG. 12 is an interval diagram showing controller signals for fully-actuated operation.

EXPOSITION

Figure 1:
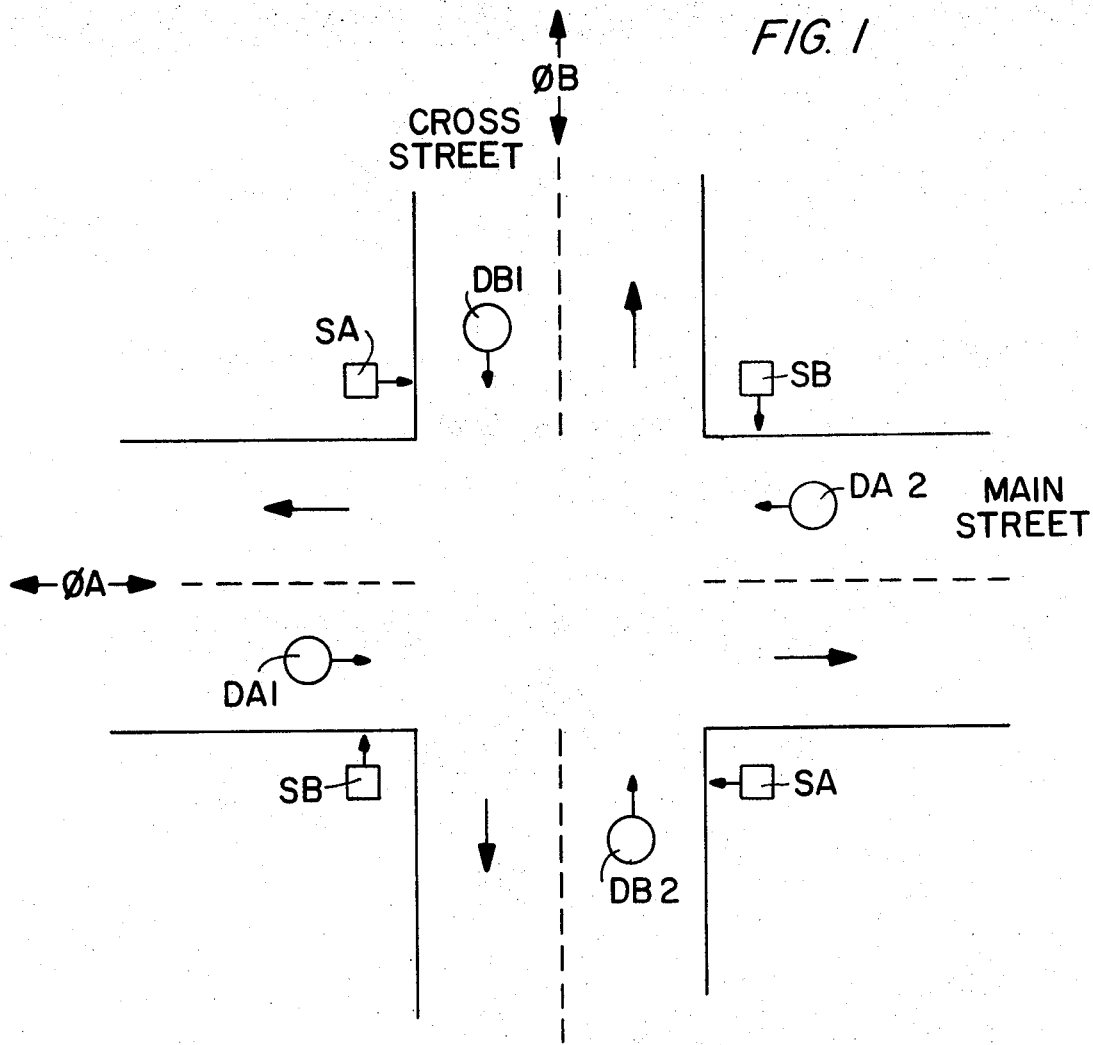
FIG. 1 is a schematic diagram of a typical intersection including a main street and cross street.

FIG. 1 is an illustration of a typical intersection including a main street referred to as phase A, and a cross street referred to as phase B. Both the main street and cross street may each include one or more lanes carrying vehicles traveling in opposite directions as indicated by the arrows. A pair of signal lights SA control vehicle movement on phase A while signal lights SB control vehicle movement on phase B. Pedestrian signal lights (not shown) may also be associated with the intersection shown in FIG. 1. In a semi-actuated or fully-actuated system one or more vehicle detectors may be located in the path of travel associated with phase A or phase B. A conventional imbedded inductive loop vehicle detector may be used. In FIG. 1 the detectors for phase A are detectors DA1 and DA2, while the detectors for phase B are detectors DB1 and DB2.

NON-ACTUATED SYSTEM

Figure 2:
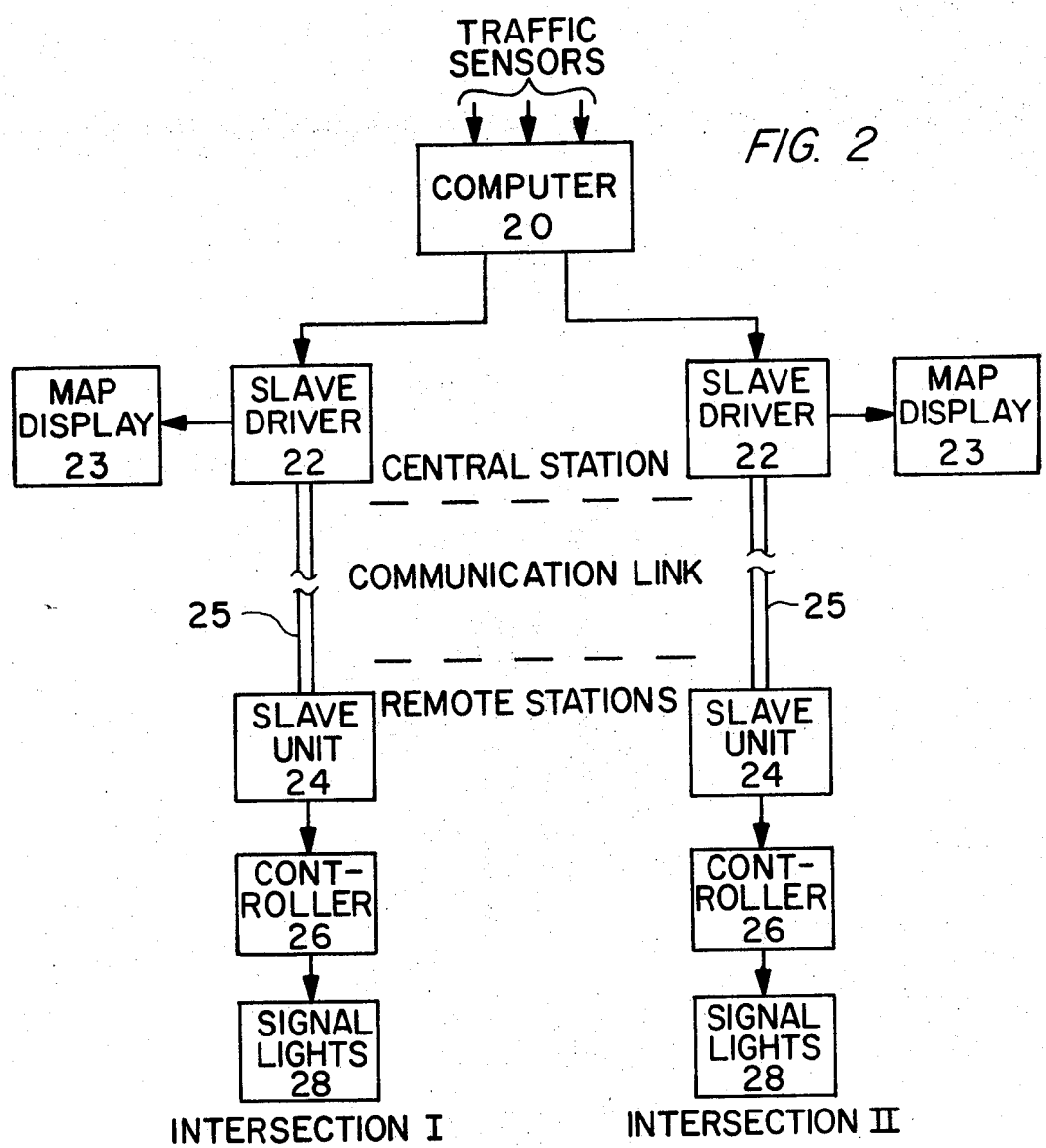
FIG. 2 is a block diagram of a traffic control system in accordance with the invention for non-actuated operation.

FIG. 2 is a block diagram of a non-actuated traffic control system constructed in accordance with this invention. The system generally includes a central station, a communication link, and a plurality of remote stations. The central station of FIG. 2 includes a computer 20 and a pair of slave drivers 22 each having a map display unit 23 associated therewith.

The map display unit 23 may have one or more indicator lights for indicating different conditions at the associated local station, such as the main street being green. The computer 20 may be a conventional general purpose computer programmed to control the operation of a plurality of remote signal controllers. A number of traffic sensors may be coupled to computer 20 to provide it with data on traffic volume, traffic density, traffic speed and any changes in these parameters. Each slave driver 22 receives commands from computer 20 when the computer decides to control the intersection associated with that slave driver. These commands are transmitted over two-wire line 25 to slave unit 24. Slave driver 22 also receives status commands from slave unit 24 which indicate that the signal controller has advanced. A change in polarity of the status command indicates to the computer that the intersection is about to display a green (proceed) signal for the main street. It is at that time that the computer may decide to control the local station.

The communication link may be a low-grade two-wire telegraph line 25 which couples between slave driver 22 and slave unit 24. FIGS. 5A and 5B show the voltage patterns on this two-wire line for both remote and local operation.

Each slave unit 24 couples to a signal controller 26 which in turn controls signal lights 28. When intersection I, for example, is under computer control the slave unit 24 receives an advance command that actuates the cam of signal controller 26 thereby advancing the controller to its next interval of operation. When the intersection is returned to local operation the dial unit of the signal controller causes actuation of the cam at fixed intervals. The specific operation of the system shown in FIG. 2 should be more clearly understood after a discussion of the specific embodiments shown in FIGS. 3 and 4 of a slave driver and slave unit, respectively.

An interval diagram indicating signal light sequences is shown in FIG. 6. For non-actuated operation the cam signal S1 is true (marked by X) for the main street green interval. Actually, the S1 siganl appears one position ahead of the G1 lamp so that the status signal returned to the computer indicates when the main street is about to turn green. The S1 signal is coupled to the slave unit which is discussed hereafter with reference to FIG. 4. For non-actuated operation the controller signals S2-S4 shown in FIG. 6 are not used. In FIG. 6 a diagram for a 16 position controller is depicted. For a 12 position controller positions 12-15 are omitted.

SLAVE DRIVER

Figure 3A:
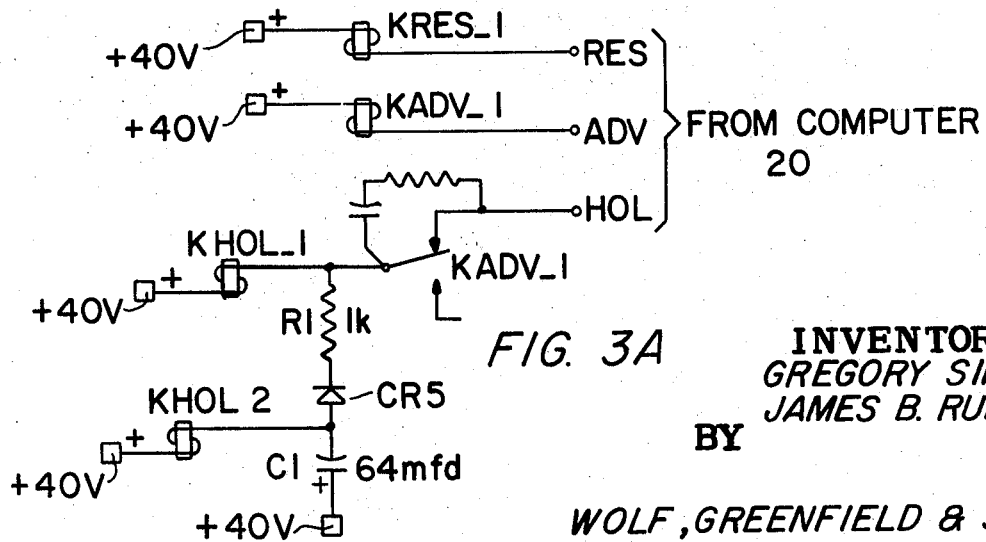

A circuit implementation for a slave driver is shown in FIGS. 3A and 3B. All relays are shown in their non-energized state. Both the normally open and normally closed contacts of each relay are provided with conventional contact filters. The filter usually includes a 30 ohm resistor in series with a 0.022 microfarad capacitor connected from the common contact of the relay to both the normally open and normally closed contacts. In this embodiment there are three command inputs from computer 20 and two status outputs to computer 20. The inputs are a resynchronization (RES) input coupled to the KRES1 relay, an advance (ADV) input coupled to the KADV1 relay, and a hold (HOL) input coupled by way of a normally closed contact of the KADV1 relay to one side of the KHOL1 relay. The other side of each of the relays KRES1, KADV1 and KHOL1 is coupled to a +40 volt power supply. The RES input is enabled (grounded) when the computer wants to resynchronize the operation of the local controller to a predetermined offset when returning the controller to local operation. The resynchronization may relate to interval 1 of the signal controller or more likely the synchronization will relate to a system zero time reference point. This mode of operation is discussed hereafter.

When the computer decides to control an intersection it waits to receive a status signal that indicates that the main street is about to turn green. Then the HOL input goes to ground and the KHOL1 relay is latched. Relay KHOL2 is also latched, by way of the circuit path including resistor R1 and diode CR5. Capacitor C1 holds relay KHOL2 latched for about 2 seconds when power is interrupted to the relay KHOL2. The contacts of relay KHOL2 couple to an indicator light (not shown) of map display unit 23. As long as the relay KHOL2 is latched this indicator light would be illuminated. As long as the HOL ground is not lifted for longer than two seconds the KHOL2 relay is latched and its normally open contact stays closed.

In another embodiment the HOL and ADV inputs may be implemented by a single input signal. Thus, the KADV1 relay would be omitted and the KHOL1 relay would be latched to hold the intersection, and unlatched to enable the controller at the intersection to advance.

The computer receives status information about the intersection from the contacts of the main street green relay KMSG1 and the check relay KCHK. When the status signals received from the slave unit indicate that the main street is about to turn green, the normally open contact of relay KMSG1 closes thereby indicating to the computer that it can now issue a HOL command to transfer operation from local to remote. The status signals are sent over the telephone line 25 during both local and remote operation. However, during local operation (see FIG. 5A) it is noted that line 25 is at ground potential except when status signals are being transmitted.

Figure 5:
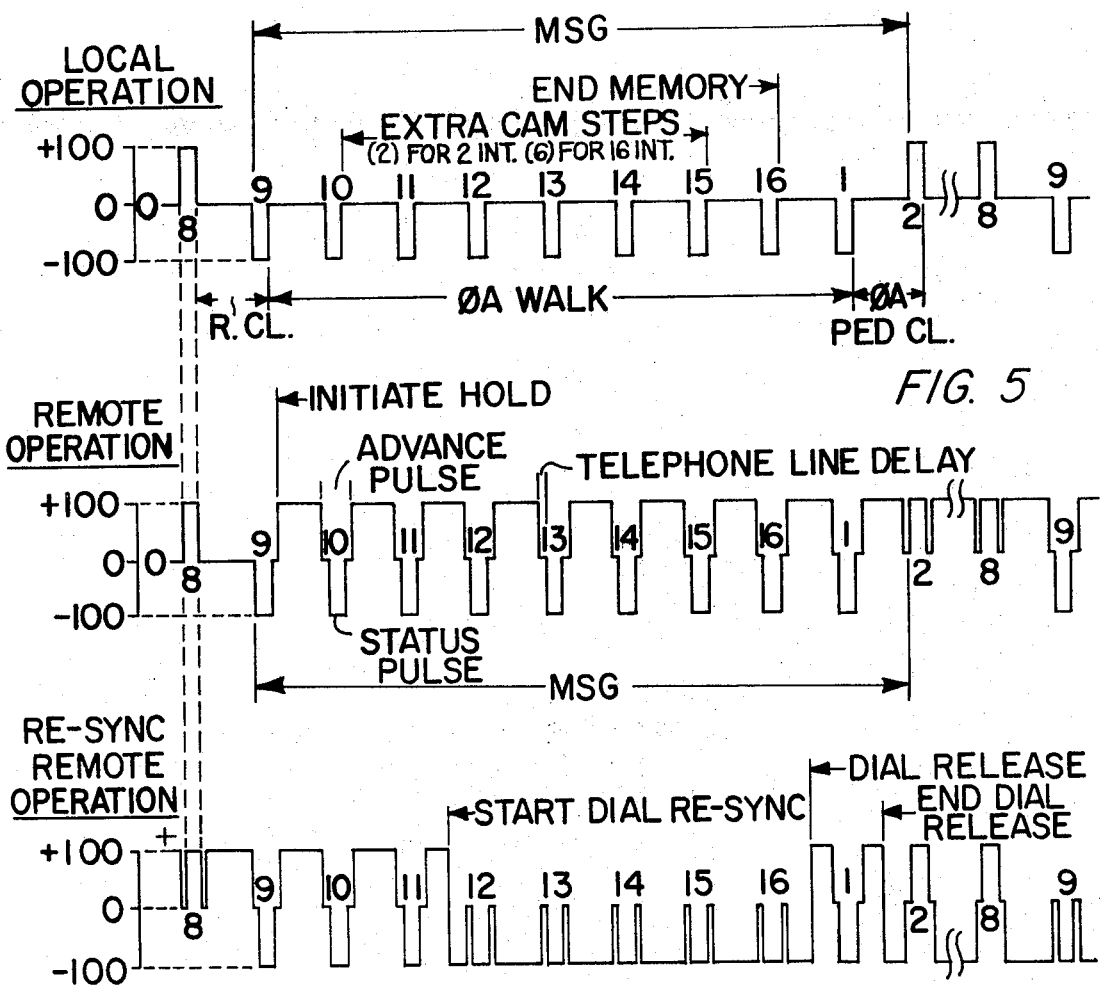
FIG. 5 shows voltage waveforms on the telephone line for the local, remote, and resynchronous modes of operation.

When the KHOL1 telay is latched by the HOL command its normally open contact closes. This couples the tip telephone lead by way of the normally open contact of the KHOL1 relay, resistor R14, the normally closed contact of relay KRES1 and resistor R6, to the +100 volt power supply. FIG. 5B shows this positive voltage level that initiates the holding of the intersection. Once the intersection is held the computer may then advance the controller into interval 10 (see FIG. 6) which is the first interval that illuminates the G1 lamp. This is accomplished by energizing the KADV1 relay for about 400 milliseconds, for example. The KHOL1 relay immediately drops out when the normally closed contact of the KADV1 relay opens. The normally closed contact of the KHOL1 relay then closes, connecting the tip telephone lead by way of resistor R5 to steering circuit 30. FIG. 5B shows this positive to ground transition. The status signal is received during the 400 millisecond ground interval of the advance command. The response of the slave unit to the HOL and ADV commands, and its generation of a status signal are discussed later with reference to FIG. 4. For now it is sufficient to state that the status signal has a duration of about 200 milliseconds, is negative during controller intervals 1 and 9–16, and is positive during controller intervals 2–8. FIGS. 5 and 6 indicate the telephone line pattern and controller intervals, respectively.

The response of the slave driver of FIGS. 3A and 3B to status signals is considered next. During both remote and local operation, each time the controller cam is advanced, a 200 millisecond polarized signal is transmitted over the telephone line. If the controller is in a phase B green interval, for example, the S1 signal is false and the status voltage on the tip lead is positive for 200 milliseconds. If S1 is true the status voltage is negative, as shown in FIG. 5A. Thus, when the controller is not in main street green, and because the KADV1 relay is still in, the positive status voltage is transferred by way of the normally closed contact of relay KHOL1 and resistor R5 to steering circuit 30. Steering circuit 30 comprises diodes CR1-CR4 arranged in a bridge circuit with resistors R2 and R3 and capacitors C2 and C3. Circuit 30 also includes zener diodes CR6 and CR7, status relays KSTA, and not-status relay KNST. The ring lead of the telephone line is conventionally terminated to ground through resistor R8. With a positive voltage on the tip lead, diodes CR2 and CR4 are forward biased and a path is provided through relay KNST and zener diode CR7. When the voltage increases sufficiently the zener diode CR7 conducts and relay KNST latches. The back biased diodes CR1 and CR3 prevent relay KSTA2 from latching. Capacitor C3 delays the dropout of relay KNST slightly when the positive voltage on the tip lead terminates. This voltage across capacitor C3 is allowed to bleed off through resistor R3. Capacitor C3 and resistor R3 have a relatively long time constant. However, because the zener diode CR7 is in series with relay KNST, the voltage does not have to decrease that much before KNST unlatches.

When the KNST relay is latched and the KSTA2 relay is unlatched, their respective contacts cause the not-main street green relay KNMG to be latched and the main street relays KMSG1 and KMSG2 to be unlatched. The first positive status pulse latches KNST, and a ground is provided for the KNMG relay through resistor R11 and the closed (normally open) contact of relay KNST. With the KSTA2 relay unlatched a positive level is coupled via resistor R10 and the normally closed contact of relay KSTA2, to the other side of relay KNMG. When the KNST relay temporarily falls out after the status pulse ends, the normally open contact of relay KNMG, which was previously closed, keeps the KNMG relay latched. Relay KNMG stays latched until a negative status pulse, (interval 9) indicating that the main street is about to turn green, is received by the slave driver.

In this embodiment, as long as relay KNMG stays latched the check relay KCHK is unlatched because the normally open contact of relay KSTA2 is open. Also, the KMSG1 and KMSG2 relays are unlatched because the normally closed contact of relay KNMG is open. The KMSG1 contact which couples to the computer indicates that the intersection is not operating in main street green. The KMSG2 contact which couples to the map display unit 23 indicates the same condition. The KCHK contact also indicates that the controller is not in main street green otherwise check pulses would be monitored as discussed hereafter.

As previously noted, when the interval just preceding the first main street green interval is advanced to by the controller, the status pulse is negative on the tip lead. This 200 millisecond negative level forward biases diodes CR1 and CR3, assuming the relay KHOL1 is unlatched which is the case during local operation or during an advance pulse under remote operation. A path is then provided through these diodes CR1, CR3, relay KSTA2 and zener diode CR6. When the voltage increases sufficiently zener diode CR6 conducts and relay KSTA2 latches. The back-biased diodes CR2 and CR4 prevent relay KNST from latching. Capacitor C2 slightly delays the dropout of relay KSTA2 when the negative voltage on the tip lead terminates after the 200 millisecond interval. The voltage across capacitor C2 is allowed to bleed off through resistor R2. Capacitor C2 and resistor R2 have a relatively long time constant. However, because the zener diode CR6 is in series with the relay KSTA2, the voltage does not have to decrease that much before KSTA2 unlatches.

When the KSTA2 relay is latched and the KNST relay is unlatched, their respective contacts cause relay KNMG to unlatch, and relays KCHK, KMSG1 and KMSG2 to latch. The first negative status pulse latches relay KSTA2, and its normally closed contact opens. The positive 100 volt level fed via resistor R10 is then coupled by way of the closed (normally open) contact of relay KSTA2 and resistor R9 to one side of the KCHK relay, instead of to one side of the KNMG relay. The unlatching of relay KNMG causes its normally closed contact to close thus providing a ground for one side of both relays KMSG1 and KMSG2. The other side of relays KMSG1 and KMSG2 couple by way of resistors R12 and R13, respectively, to the +100 volt power supply. When the KSTA2 relay temporarily falls out after the termination of the negative status pulse, the 100 volt supply is applied via resistor R10 to one side of relay KNMG. This relay, however, does not latch as no ground path is closed through the KNMG relay. At the same time the normally open contact of relay KSTA2 opens and power via resistor R9 is interrupted to the KCHK relay. Capacitor C4 prevents relay KCHK from falling out for about one second. Thus, the contacts of the KCHK relay provide a check pulse coupled to the computer whenever a negative (main street green) status pulse is received over the tip telephone lead. Also, the normally open contact of the KMSG1 relay closes upon the occurrence of the first negative status pulse and stays closed until the main street green interval ends. The contacts of the KMSG2 relay connect to the map display unit 23 to indicate a main street green condition for the intersection.

Figure 3C:
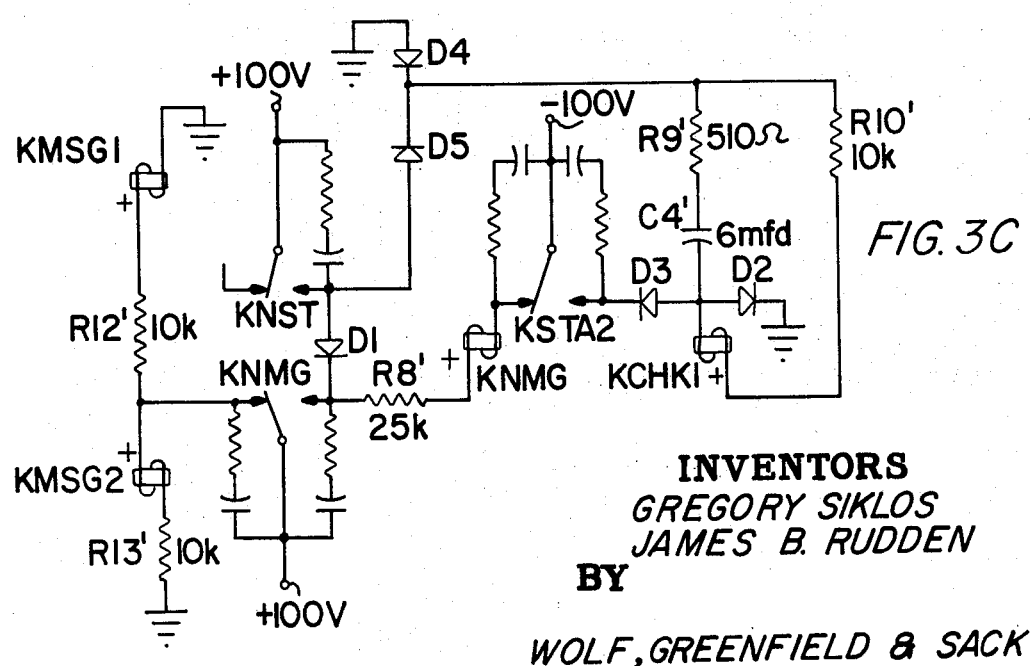
FIG. 3C shows another arrangement for part of the circuitry of the slave driver of FIGS. 3A and 3B.

FIG. 3C shows an alternate arrangement for the KMSG1, KMSG2, KNMG and KCHK1 relays which provides a check pulse for cam advances both during the intervals when the main street is green and the intervals when it is not green. In FIG. 3B the KCHK1 relay was unlatched when not in main street green and could not send a check pulse to the computer during those intervals. In FIG. 3C the KCHK1 relay may be latched and unlatched to send a pulse to the computer during main street green and main street not green.

The arrangement of relays and corresponding contacts in FIG. 3C is similar to the arrangement of FIG. 3B. The KMSG1 and KMSG2 relays each tie on one side to ground, and the other sides couple to resistors R12' and R13' respectively. One side of relay KNMG couples via resistor R8' to its own normally open contact, and also via resistor R8' and diode D1 to the normally open contact of the KNST relay. The other side of the KNMG relay connects to the normally closed contact of the KSTA2 relay. One side of the KCHK1 relay connects via diode D2 to ground and via diode D3 to the normally open contact of the KSTA2 relay. The other side of relay KCHK1 couples via resistor R10' to diode D4 and via diode D5 to the normally open contact of the KNST relay.

The operation of the circuit of FIG. 3C is similar to that of FIG. 3B. When the system is not in a main street green interval, the KNST relay (see FIG. 3B) is latched for about 200 milliseconds, and the KSTA2 relay is unlatched. Thus, in FIG. 3C the KNMG relay is latched through the closed (normally open) contact of the KNST relay, and the normally closed contact of the KSTA2 relay. The KMSG1 and KMSG2 relays are unlatched because the normally closed contact of the KNMG relay is open (KNMG latched). A +100 volt level is fed via the closed (normally open) contact of the KNST relay (KNST latched), diode D5, and resistor R10' to one side of the KCHK1 relay, the other side of which is coupled via diode D2 to ground, causing the KCHK1 relay to temporarily latch. When the status pulse terminates the KNST relay falls out, the +100 volt level is lifted from the KCHK1 relay, and eventually the KCHK1 relay falls out. Capacitor C4' and resistor R9' are tied in series between one side of relay KCHK1 and the commonly tied cathodes of diodes D4 and D5, and provide a decaying time constant that delays the unlatching of relay KCHK1. Thus, a check pulse is transmitted to the computer by virtue of the latching and unlatching of the KCHK1 relay during not main street green. This indication is coupled to the computer via the contacts of the KCHK1 relay (see FIG. 3B).

The operation of the KCHK1 relay during the main street green intervals is substantially the same as discussed with reference to FIG. 3B. During those intervals the KNST relay is unlatched and the KSTA2 relay is successively latched for about 200 milliseconds by the status pulse. When this occurs the normally open contact of the KSTA2 relay closes and the normally open contact of the KNST relay opens. The KNMG relay falls out due to the switching of the KSTA2 relay contacts. Thus a negative 100 volt level is applied via diode D3 to one side of the KCHK1 relay, the other side of which ties via resistor R10' and diode D4 to ground, latching relay KCHK1. When the status pulse terminates the KSTA2 relay falls out, the −100 volt level is lifted from the KCHK1 relay, and eventually the KCHK1 relay falls out as determined by capacitor C4' and resistor R9'. Therefore, a check pulse is also sent to the computer by virtue of the latching and unlatching of the KCHK1 relay during main street green intervals. Many times it is the computer requirements that dictate when check pulses are needed.

SLAVE UNIT

A circuit implementation for slave unit 24 of FIG. 2 is shown in FIG. 4 with all the relays in their non-energized state. Each relay is provided with a conventional contact filter. Unit 24 connects over two-wire telephone line 15 to its corresponding slave driver 22, and has connections to the local signal controller to receive interval signals and control advancement of the controller. In the non-actuated (no detectors) system only one signal is coupled from the signal controller to terminal 44 of the slave unit. This signal is referred to as the S1 signal, and for an operational sequence as shown in FIG. 6, S1 is true (high) during intervals 1 and 9-16. In other embodiments S1 could be true during different intevals depending upon whether the computer wanted to sense main street green or, for example, cross street green. FIG. 4 also shows the output terminal 42 which couples to the cam (not shown) of the signal controller. A signal is coupled from terminal 42 to the signal controller to advance the cam during either local or computer controlled operation. Another output signal is coupled at terminal 46 to the signal controller during resynchronization operation. This mode of operation is used to periodically resynchronize the local controller to the appropriate offset before changing from remote to local operation. This type of operation is discussed hereinafter.

There are five terminals V, W, X, Y and Z shown in FIG. 4 which connect in the following manner for non-actuated operation. Terminal V connects to a conventional 60 cycle AC power supply. Terminals X and Y are directly connected while terminal Z is left open. An output from the dial of the controller connects to terminal W. During local operation the dial controls cam advancement, and periodic AC signals are received at terminal W to cause such advancement. If the signal controller is operating under local control, as discussed with reference to FIGS. 3A and 3B, the KHOL1 relay is not latched and the tip telephone lead is at ground except during the status pulse (see FIG. 5A). The step relay KSTE1 is unlatched except during a status pulse and thus relays KRES2 and KADV2 are not energized during local operation. The respective contacts of relays KRES2 and KADV2 are in the rest position shown in FIG. 4, and a path is provided from AC terminal V via resistor R15 and the normally closed contacts of relays KRES2 and KADV2 to terminals X and Y, and the normally open contact of relay KHOL3. With relay KADV2 unlatched, no power path is provided to relay KHOL3, and thus it remains unlatched. The normally closed contact of relay KHOL3 stays closed and only local cam advancement is enabled via resistor R16 from terminal W. When a periodic AC signal is coupled to terminal W from the signal controller, this signal passes through resistor R17 to the gate of TRIAC TR1 causing it to conduct. One of the main terminals of TRIAC TR1 connects to a 60 cycle AC source, and the other connects to terminal 42. When TRIAC TR1 is turned on by the gate voltage, AC is passed to terminal 42 and thence to the cam of the signal controller to cause it to advance. During local operation the advance signal is passed through the normally closed contact of relay KHOL3, while during remote operation the signal passes to TRIAC TR1 via the normally open contact when closed by the latching of relay KHOL3.

When the system is operating under remote computer control, as discussed with reference to FIGS. 3A and 3B, the KHOL1 relay is latched to hold the intersection and unlatched to advance the intersection controller. The tip telephone lead is at a positive level during the hold and goes to ground for an advance. FIG. 5B shows the voltage pattern on the telephone line for remote operation. Thus when the tip lead is positive and the normally closed contact of the KSTE1 relay is closed, a path is provided via resistor R18 to the steering circuit 40 of the slave unit. Steering circuit 40 comprises diodes CR10-CR13 arranged in a bridge circuit with resistors R20 and R21 and capacitors C20 and C21. Circuit 40 also includes zener diodes CR14 and CR15, advance relay KADV2, and resynch relay KRES2. The steering circuit 40 may be identical to circuit 30 of FIG. 3B and operates as discussed previously. When the tip telephone lead is positive (during hold) diodes CR11 and CR13 are forward-biased and the KADV2 is latched. The normally open contact of the KADV2 relay closes, and a path is provided from AC terminal V through resistor R15, the closed (normally open) contact of relay KADV2, diode CR16 and resistor R22 to one side of relay KHOL3, the other side of which is grounded. Relay KHOL3 almost immediately latches and its normally open contact closes thereby interrupting local operation via terminal W. Resistor R23 connects between resistor R22 and capacitor C22, and is of a suitable value to cause relay KHOL3 to quickly latch. With relay KHOL3 latched and capacitor C22 charged diode CR17 which is in parallel with resistor R23 becomes forward-biased. Capacitor C22 keeps the KHOL3 relay latched for about two seconds after power is interrupted to the KHOL3 relay.

At some time thereafter the computer issues an advance ADV command (see FIG. 3A) and the voltage on the tip telephone lead goes to ground. About 100 milliseconds thereafter the KADV2 relay drops out and its normally closed contact closes. This closure provides a circuit path from AC terminal V, through the normally closed contacts of relays KRES2 and KADV2, to terminals X and Y, through the now closed (normally open) contacts of relay KHOL3 to TRIAC TR1. This causes an AC signal on terminal 42 to advance the controller cam under computer control. The duration of this ground advance pulse as shown in FIG. 5B is about 400 milliseconds.

When the KADV2 relay unlatches the AC power from terminal V is no longer fed via diode CR16 to the KHOL3 relay. However, the charge upon capacitor C22 holds relay KHOL3 latched for up to 2 seconds. When the advance pulse is only 400 milliseconds the KHOL3 relay does not fall out and the intersection is held under computer control. To return the intersection to local control the hold (positive) level is dropped (ground) for over 2 seconds, relay KHOL3 falls out and its normally closed contact closes, returning the signal controller to local dial operation by way of terminal W.

Thus, during local operation the cam is advanced from the dial, and during remote operation it is advanced under computer control. In either case TRIAC TR1 conducts to transfer the AC voltage to terminal 42. When TRIAC TR1 conducts, the AC signal coupled to terminal 42 also is fed via diode CR18, resistor R24, capacitor C24 and resistor R25 to one side of the KSTE1 relay, the other side of which is grounded. Diode CR18 rectifies the AC signal and passes only the positive portion of the signal. Diode CR19 prevents reverse current from passing through relay KSTE1 by clamping the cathode of diode CR19 to essentially ground potential. Without diode CR19, a reverse current would flow through relay KSTE1 when capacitor C24 discharged. When capacitor C24 becomes fully charged current flow through relay KSTE1 stops for the balance of the cam interval. The time constant including capacitor C24 and resistors R24 and R25 is designed so that relay KSTE1 is latched for about 200 milliseconds, which is the duration of the status pulse as shown in FIG. 5B.

One hundred milliseconds after the tip lead voltage goes to ground (ADV) the KSTE1 relay latches and its normally open contact closes. Either a +100 volt or −100 volt level is coupled via resistor R26 and the closed (normally open) contact of relay KSTE1 to the tip lead, depending upon the state of the status relay KSTA1.

FIG. 4 shows a conventional rectifier circuit 47 for converting the AC signal into a positive 100 volts at terminal 49 and a negative 100 volts at terminal 51. The positive and negative voltages are coupled via resistors R27 and R28 to the normally closed and normally open contacts of relay KSTA1, respectively. A positive voltage is applied to the tip telephone lead when the KSTA1 relay is pulled in while a negative voltage is applied to the tip telephone lead when the KSTA1 relay is latched. FIGS. 5 and 6 indicate that the S1 status signal is true during intervals 1 and 9-16. Thus, when the controller advances to interval 9, under either local or remote control, the S1 signal impressed on terminal 44 goes high and the KSTA1 relay latches. The circuit path is through rectifying diode CR20, resistors R26 and R27 and relay coil KSTA1 to ground. The KSTA1 relay stays latched during intervals 10-16 and 1, in that order, because the S1 signal stays high. Capacitors C25 and C26 tend to hold relay KSTA1 latched if the S1 signal is temporarily interrupted. Thus, for the main street green intervals, relay KSTA1 is latched and a negative status pulse of 200 milliseconds duration is impressed on the tip telephone lead. Alternatively, for the other intervals a positive status pulse is impressed on the tip telephone lead (see FIGS. 5A and 5B). At the slave driver the step pulses operate either relay KSTA2 or KNST depending on the pulse polarity, as discussed previously with reference to FIG. 3B.

SEMI-ACTUATED SYSTEM

Figure 7:
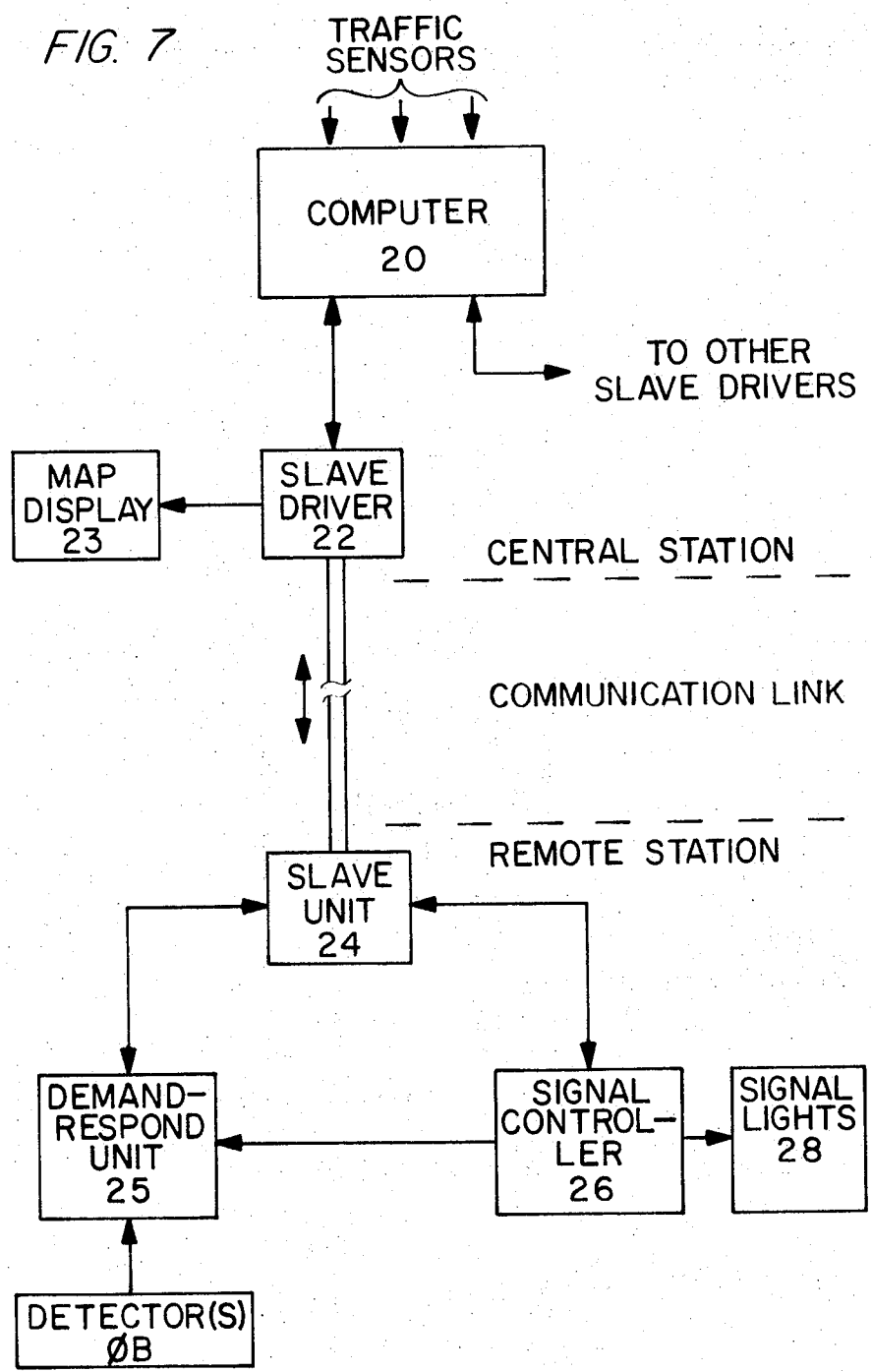
FIG. 7 is a block diagram of a semi-actuated traffic control system in accordance with this invention.

FIG. 7 is a block diagram similar to that shown in FIG. 2 for semi-actuated operation. The central station includes computer 20, slave driver 22 and map display unit 23. The remote station includes slave unit 24, signal controller 26 and signal lights 28. The slave driver 22 and slave unit 24 may use the circuitry shown in FIGS. 3 and 4, respectively. FIG. 7 also includes a demand-respond unit 25 which interconnects to slave unit 24 and signal controller 26. One or more detectors associated with phase B also couple to unit 25. FIG. 1 shows phase B detectors DB1 and DB2.

The system shown in FIG. 7 operates in a similar manner to the non-actuated system of FIG. 2. However, the semi-actuated system is responsive to the presence and absence of vehicles on phase B during both local and remote operation to control sequencing of the signal controller. During local operation the controller steps to a phase A rest or dwell position and remains in that position as long as no vehicles are detected on phase B. After a predetermined interval the computer may want to control the intersection and advance the controller out of phase A dwell regardless of whether any phase B detections have occurred. The computer issues a hold command which transfers operation to the remote mode. The computer then issues an advance command of 400 milliseconds duration. If no phase B vehicles have been yet detected, the advance pulse has no effect on the signal controller and the controller does not advance out of phase A dwell. The controller will always advance out of dwell, however, in either local or remote operation when a phase B detector is actuated. Also, when the recall switch for remote or local operation is active, the controller will advance out of dwell.

If no phase B detections occur during remote operation the computer can issue a force-off command to force the controller to advance even though no phase B detections were received. This force-off command is issued by extending the typical advance pulse from 400 to 800 milliseconds. Thus, in FIG. 3 the ADV input from computer 20 would be present for 800 milliseconds. This condition is sensed by demand-response unit 25 and the controller advances.

In another embodiment of the invention a demand-respond unit is used for both phase A and phase B. The second unit would have one or more phase A detectors coupled to it and would keep the controller in a phase B dwell interval until a call (vehicle or pedestrian detection) was received from the phase A detector.

DEMAND-RESPOND UNIT - DWELL

Figure 8:
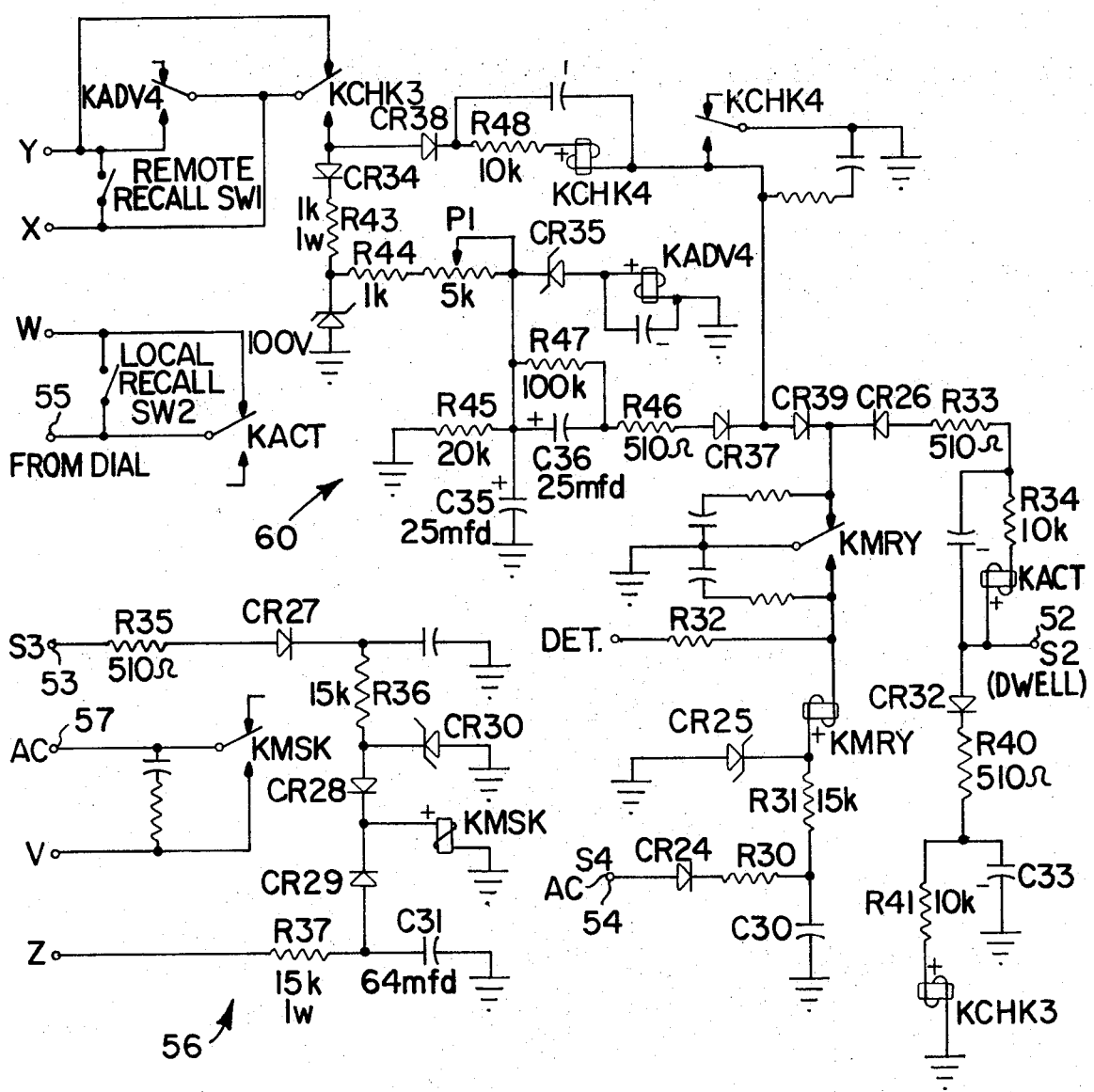
FIG. 8 is a circuit diagram of one embodiment of a demand-respond unit of FIG. 5.

FIG. 8 shows one circuit implementation for the demandrespond unit 25 shown in FIG. 7. This unit is responsive on the phase A dwell interval to phase B detections. Hereafter, in FIG. 9, another demand-respond unit is considered. That unit is responsive on the phase A dwell, for example, to phase B detections, and in addition is responsive to continued detections (extensions) on its own phase.

The diagram of FIG. 6 also applies to the demand-respond unit of FIG. 8. Thus, the S1 signal is still true during intervals 1 and 9-16. The S2 (DWELL) signal from the controller is true only during interval 16, whereas the S3 (MASK) signal is true during intervals 10 and 16. The S4 (MEMORY) signal is true during intervals 7-16. The function of these particular signals is discussed with reference to FIG. 8.

The S2-S4 signals from the signal controller are coupled to terminals 52-54, respectively, of the demand-respond unit. The S1 signal couples to the slave unit 24 as previously discussed with reference to FIG. 4. Other external connections are made to the slave unit of FIG. 4. The terminals V-Z of FIG. 4 connect directly to the like terminals V-Z of FIG. 8. There is one other connection from the dial unit of the controller to terminal 55. In the non-actuated system the dial was connected directly to the slave unit.

During local operation the KHOL3 relay (see FIG. 4) is not latched, its normally open contact is open, and cam advancement can only occur by an AC signal from the controller dial. This signal is coupled to terminal 55, and if the actuate relay KACT is unlatched, it passes by way of the normally closed contact of relay KACT to terminal W, and thereafter causes conduction of TRIAC TR1 and advancement of the cam (see FIG. 4). The KACT relay is unlatched, permitting local cam advancement in all controller intervals except interval 16 which is the phase A DWELL interval. Thus, when the controller advances under local operation to the phase A DWELL interval, the S2 signal goes high enabling the KACT relay to latch but only if no detection has previously occurred on phase B. If a detection has occurred the KACT relay does not latch and the controller sequences out of the phase A DWELL interval through a complete traffic cycle.

In FIG. 8 the memory relay KMRY is enabled by the S4 signal which is an AC signal from the controller applied to terminal 54 during intervals 7-16 (see FIG. 6). This signal is rectified in the positive direction by diode CR24 and passes by way of resistors R30 and R31 to one side of relay KMRY, Zener diode CR25 controls the voltage to a +24 volt level, for example, at this side of relay KMRY. Capacitor C30 which connects to resistors R30 and R31 holds relay KMRY latched if the S4 signal is temporarily off. One or more phase B detectors couple to the other side of the KMRY relay through resistor R32. When a vehicle is detected this DET input goes to ground, and if the controller is in any one of intervals 7–16, the KMRY relay latches. The normally open contact of the KMRY relay then closes and the KMRY relay is held in a latched position until the phase A DWELL interval is reached. Subsequent vehicle detections during intervals 7–16 have no effect on the KMRY relay as it is already latched.

Therefore, if the system is still under local control, and the controller steps to the phase A DWELL interval, the KACT relay latches if no phase B detections have occurred. The circuit path is from ground, through the normally closed contact of the KMRY relay, diode CR26, resistors R33 and R34 to one side of the KACT relay. The latching of the KACT relay causes its normally closed contact to open and prevent the signal on terminal 55 from passing to terminal W. The controller could theoretically remain in the phase A DWELL interval indefinitely. However, when a phase B detection occurs the KMRY relay latches, its normally closed contact opens and the KACT relay falls out. The normally closed contact of the KACT relay closes and the path is completed between terminals 55 and W, thereby allowing controller advance under dial control.

FIG. 8 also shows the isolated (local) recall switch SW2 in its unused state. When this switch is closed terminals 55 and W are interconnected and the controller always advances out of phase A DWELL regardless of whether a phase B detection occurred or not. The other way to leave the phase A DWELL interval when no phase B detections have occurred is by sending a force-off command of 800 milliseconds from the computer. If the controller is in either phase A DWELL or initial phase A green when the force-off command is sent the controller is allowed to advance. However, if local operation timing had already advanced the controller out of phase A DWELL, the force-off command is blocked by mask circuit 56 of FIG. 8. The mask circuit 56 is necessary so that the force-off command does not interrupt the interval that local operation is in.

Mask circuit 56 comprises a mask relay KMSK and associated contact. Terminals V and Z, coupled from like terminals of the slave unit, connect to the mask circuit. The S3 signal from the controller also couples to mask circuit 56. The S3 signal is true during intervals 10 and 16 (see FIG. 6) whether operation is in the local or remote mode. In either of these intervals the S3 signal at terminal 53 passes by way of resistors R35 and R36 and diodes CR27 and CR28 to one side of the KMSK relay, the other side of which is grounded. Diodes CR27 and CR28 pass the positive portion of the S3 signal and latch the KMSK relay. Zener diode CR30 stabilizes the voltage across the KMSK relay and capacitor C31. When the KMSK relay latches its normally open contact closes and the AC voltage at terminal 57 is coupled to terminal V. In FIG. 4 this AC voltage is coupled via resistor R15 to the common contact of relay KADV2, and assuming relay KADV4 is latched as discussed hereinafter, the cam advances out of the DWELL interval. The advancement of the cam during local operation occurs by way of the normally open contact of relay KHOL3 when a force-off command is issued, because the KHOL3 relay is latched. With relay KHOL3 latched the positive voltage passed by diode CR16 (see FIG. 4) is coupled via like terminals Z, resistor R37 and diode CR29 to one side of the KMSK relay, locking this relay on for as long as the KHOL3 relay is latched. The issuance of a force-off command during remote operation also forces the controller out of a dwell interval, for example.

When the computer decides to control an intersection the HOL signal is generated. This latches relay KHOL3, FIG. 4, when the KADV2 relay latches. Of course, this is assuming that the AC power is available at terminal V when the hold command is sent during the initial main street green interval. The AC power is coupled from terminal V to terminal X when the KADV2 relay falls out (FIG. 4) at the commencement of the advance command, and if the KCHK3 relay is not latched the AC signal is coupled by way of the normally closed contact of relay KCHK3 to terminal Y and thence to TRIAC TR1. Relay KCHK3 is latched only during the phase A DWELL interval, thus the normally closed contact of relay KCHK3 permits controller advance for all intervals except the phase A DWELL interval.

When the S2 signal is impressed on input terminal 52, relay KCHK3 is latched. The circuit path includes diode CR32 and resistors R40 and R41 coupled between terminal 52 and one side of relay KCHK3, the other side of which is grounded. Capacitor C33 couples to resistors R40 and R41, and holds relay KCHK3 latched for a short time after the S2 signal terminates. Therefore, during each phase A DWELL interval the KCHK3 normally open contact closes, and the AC signal on terminal X is coupled to timing circuit 60.

Timing circuit 60 is adapted to sense the 800 millisecond force-off signal when no phase B detection has occurred. Circuit 60 includes relays KADV4 and KCHK4, and is timed out, latching relay KADV4 when (1) a force-off 800 millisecond level is received via terminal X and relay KMRY is not latched, or (2) a typical 400 millisecond advance pulse is received and relay KMRY is latched.

When the KCHK3 relay is latched the 400 or 800 millisecond AC signal is coupled via terminal X rectifying diode CR34, resistors R43 and R44, potentiometer P1, and zener diode CR35 to one side of relay KADV4, the other side of which is grounded. Timing circuit 60 also includes resistors R45, R46 and R47, capacitors C35 and C36 and diode CR37, connected as shown. The connection from terminal X through the normally open contact of the KCHK3 relay is also coupled via resistor R48 and diode CR38 to one side of relay KCHK4. The other side of this relay couples to the normally open contact of relay KCHK4, and also through diode CR39 to the normally closed contact of relay KMRY.

If the KMRY relay is not latched a ground is provided through the normally closed contact of relay KMRY, diodes CR37 and CR39 and resistor R46 to one side of timing capacitor C36. The time constant of the timing circuit can be adjusted by potentiometer P1 so that when capacitor C36 is grounded, relay KADV4 latches about 600 milliseconds after the advance pulse coupled from terminal X commences. An 800 millisecond advance pulse, however, is sufficiently long to latch relay KADV4 and force the controller to advance. For this 400–800 millisecond operation the capacitor C35 which couples from capacitor C36 to ground is omitted in FIG. 8. It is used as shown, however, when it is desirable to time through the DWELL interval. This type of operation is referred to as interlock operation (see FIG. 6). During intervals 2–16 a 200 millisecond advance pulse could be used to advance the cam. After the phase A DWELL had been timed, however, an interlock pulse of say 400 millisecond duration could be used to latch the KADV4 relay if the KMRY relay is latched. If the KMRY relay is not latched capacitor C36 is grounded and thus the timing circuit 60 has a longer time constant. After a set number of 400 millisecond advance pulses the computer would then send a 800 millisecond force-off pulse to latch relay KADV4.

When the KMRY relay is latched and capacitor C35 is omitted, no ground is provided for capacitor C36 so the advance pulse quickly latches relay KADV4. In either case relay KADV4 latches, its normally open contact closes and the AC signal on terminal X passes to terminal Y to cause cam advancement.

During remote operation the KMSK relay stays latched via terminal Z once it is latched. The relay KMSK has about a two second fall out delay similar to relay KHOL3. Thus, the KMSK relay only falls out when the computer releases from remote control.

The KCHK4 relay functions as an interlock that enables the timing circuit to time out if a memory detection occurs after the commencement of the advance pulse. The advance pulse on terminal X latches relay KCHK4 almost immediately. The KCHK4 contact keeps the KCHK4 relay latched by providing its own ground. Thus, if the KMRY relay latches its normally closed contact opens. However, relay KCHK4 stays latched and the closed (normally open) contact of relay KCHK4 provides a ground for timing capacitor C36 allowing timing circuit 60 to time out. If the detection occurs just prior to the advance pulse, relay KCHK4 does not latch and relay KADV4 latches providing an immediate cam advance via its contacts.

FIG. 8 also shows a remote recall switch SW1 which is operative when in a closed position. Terminals X and Y are then directly interconnected and a typical 400 millisecond advance pulse will cause cam advancement during the phase A DWELL interval regardless of the state of the KMRY relay.

SEMI-ACTUATED SYSTEM-WITH EXTENSION

Figure 9A:
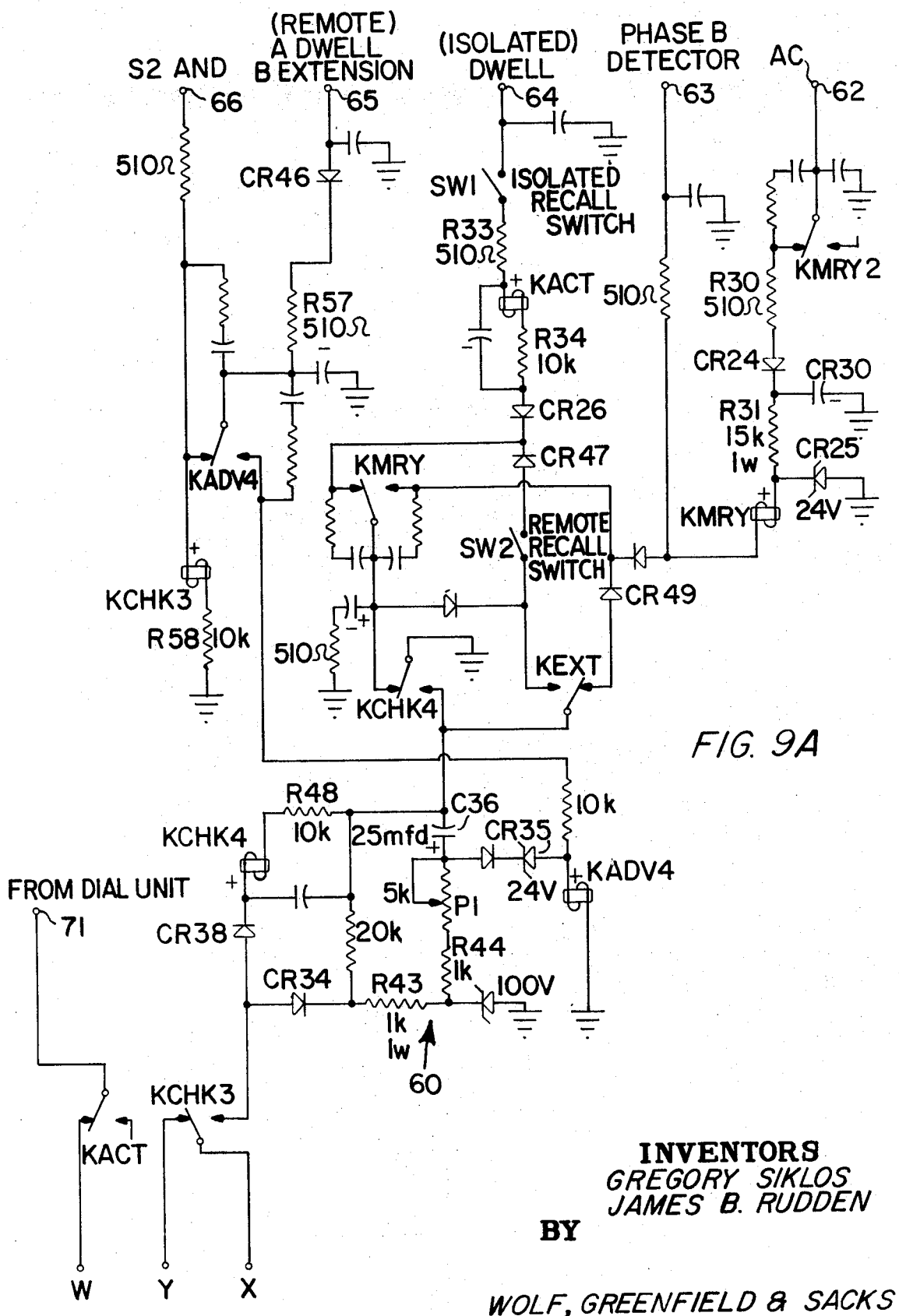
FIGS. 9A and 9B are a schematic diagram of a fully-actuated traffic control system in accordance with this invention.
Figure 9B:
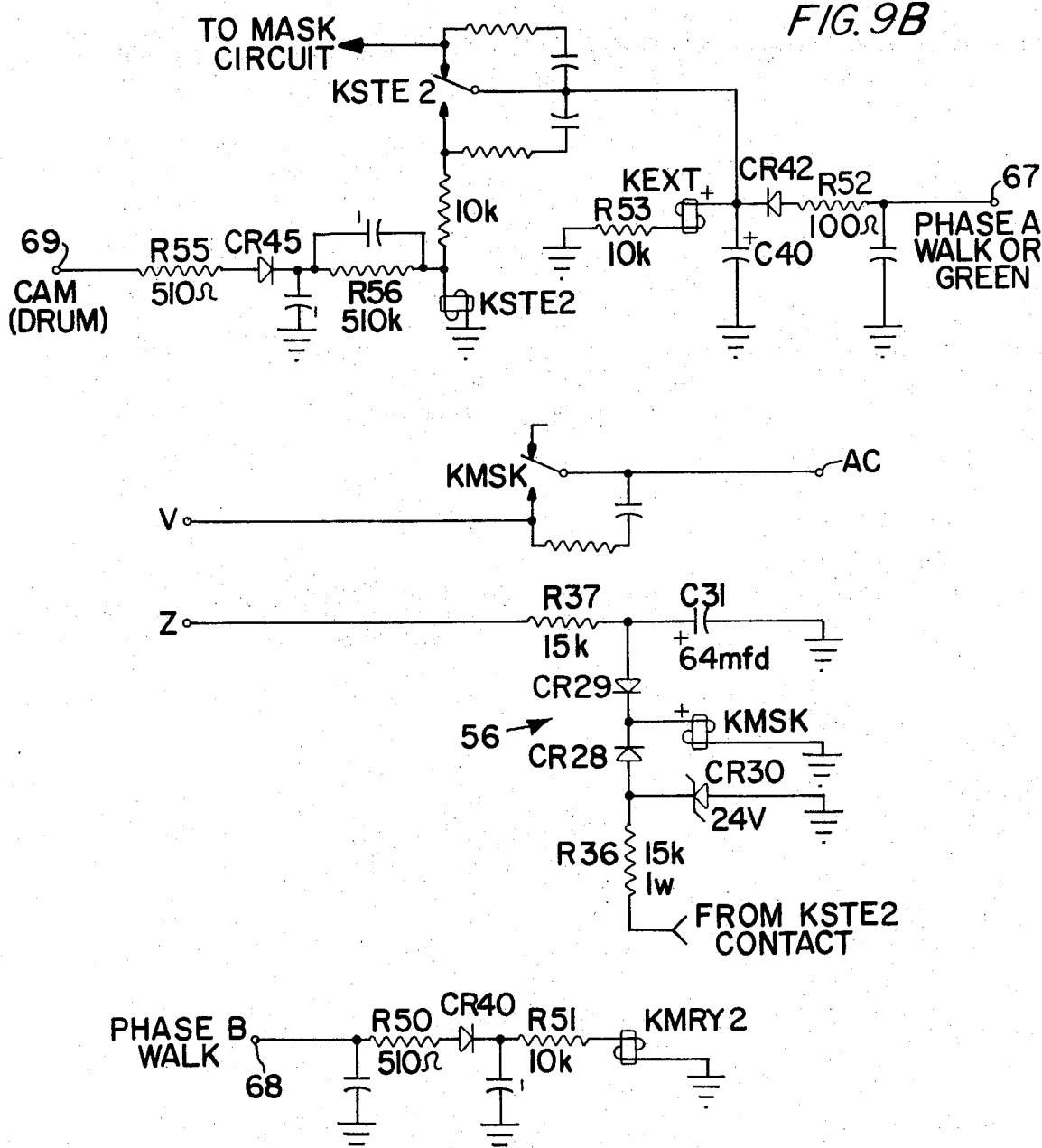

The block diagram of FIG. 7 also covers semi-actuated operation where the demand-respond unit 25 is responsive to phase B detections during the phase A DWELL interval, and is also responsive to phase B detections during the phase B extension interval to extend the phase B green signal light up to a predetermined maximum interval. The controller interval diagram of FIG. 12 shows the signal light sequence and intervals for the controller signals S1–S3 for operation with an extension interval. The S1 and S3 signals are true during the same intervals as shown in FIG. 6. However, the dwell extension signal S2 is now true during phase B extension interval 7 and phase A DWELL interval 16. FIG. 9 shows a second embodiment for a demand respond unit used in a semi-actuated system and responsive to both dwell and extension intervals.

Most of the circuitry shown in FIG. 9, and the operation thereof, is similar to the circuitry and operation of the demand-respond unit shown in FIG. 8. Most of the relays and other components are therefore labeled identically. In FIG. 9 certain of the controller signal (S1-S3) inputs have been replaced by actual signal light actuating signals. For example, the phase A green signal replaces the S3 signal. For some applications this is desirable as it reduces the number of signals that the controller is required to generate.

The terminals V-Z connect to like terminals V-Z of the slave unit of FIG. 4. The other external connections to the demand-respond unit of FIG. 9 are from the signal controller and from the vehicle detector which is the phase B detector in this embodiment. An AC voltage is applied at terminal 62, and the phase B detector is coupled to terminal 63. terminal 64 receives a positive level (S2 signal) during the phase A dwell interval while terminal 65 receives a positive level during both the phase A dwell interval and phase B extension interval (see FIG. 12). For the embodiment of FIG. 7 no connection is made externally from AND terminal 66. Connections to terminal 66 are discussed hereinafter with reference to FIGS. 10 and 11. The terminal 67 ties to the phase A walk of phase A green controller signal, and terminal 68 ties to the phase B walk signal. Terminal 69 receives an input from the controller cam when the cam advances. There is one other connection from the dial unit of the controller to terminal 71.

As previously discussed with reference to FIG. 8, during local operation, cam advance occurs from the dial signal via terminal 71 and the normally closed contact of relay KACT. Under local control cam advancement proceeds in all intervals except the phase A dwell interval. During that interval the KACT relay is latched if no phase B detection has occurred, and the dial input is interrupted through the normally closed contact of relay KACT. When a phase B detection occurs the KACT relay falls out because the ground via diode CR26 and resistor R34 is lifted by operation of the contact of relay KMRY. Cam advancement out of phase A dwell then is allowed.

The memory relay KMRY operates like the KMRY relay of FIG. 8. In FIG. 9 this relay is enabled by the AC input voltage coupled through the normally closed contact of relay KMRY2 and rectified by diode CR24. When the phase B detector input to terminal 63 goes to ground relay KMRY latches and is locked in a latched condition through its own closed (normally open) contact and the normally closed contact of relay KCHK4, as long as the latter relay stays unlatched. The operation of the KMRY2 relay once each controller cycle causes the KMRY1 relay to fall out. The phase B walk signal (see FIG. 12) is coupled to terminal 68 and thence through resistors R50 and R51 and diode CR40 to one side of relay KMRY2, the other side of which is grounded. When the KMRY2 relay latches its normally closed contact opens and the KMRY relay temporarily falls out. This operation provides a memory reset prior to arriving in the phase B extension interval so that if no further vehicles are detected the KMRY memory stays unlatched and when the controller reaches the B extension interval it quickly advances to the next controller interval.

FIG. 9 also shows one location for the isolated recall switch SW1. One contact of this switch couples to terminal 64 and the other to resistor R33. When this switch is left open the KACT relay cannot latch so cam advancement via the dial is not interrupted regardless of the state of the KMRY relay. The other way to leave the phase A dwell interval during local operation is by sending a force-off command of 800 milliseconds from the computer.

If the controller is in the phase A green interval 10 under local operation, when the 800 millisecond force-off command is sent timing circuit 60 times out and the controller advances. However, if local operation is not in interval 10, the mask circuit 56 blocks the force-off command, preventing an interruption of local operation at that time.

The mask circuit 56 of FIG. 9 is similar to circuit 56 of FIG. 8. However, the input to resistor R36 is taken from the normally closed contact of relay KSTE2 instead of from the S3 signal. When the controller proceeds to the phase A green interval 10 the AC voltage is applied to terminal 67 and by way of resistor R52 and diode CR42 to one side of extension relay KEXT, the other side of which is tied via resistor R53 to ground. Capacitor C40 delays the fallout time of relay KEXT at the end of the phase A green interval. The AC signal on terminal 67 is also coupled via resistor R52 and diode CR42 to the common and normally closed contacts of relay KSTE2, and from thence to mask circuit 56. Thus, when the controller enters phase A green a positive level is fed to the mask circuit 56 and relay KMSK latches. When this occurs the normally open contact of the KMSK relay closes, AC voltage is available at terminal V, and cam advancement follows. This cam advance signal is coupled to terminal 69 and via resistors R55 and R56 and diode CR45 to one side of relay KSTE2 the other side of which is grounded. When relay KSTE2 latches, its normally closed contact opens and the KMSK relay falls out after about two seconds, as determined by capacitor C31. The capacitor C40 holds the KEXT relay latched long enough so that the KSTE2 relay does not fall out and erroneously reapply the positive signal to the mask circuit before the end of the phase A green interval. The mask circuit operates as discussed previously for remote operation. In other words, once the KMSK relay latches the feedback via terminal Z keeps it latched for as long as the controller stays in the remote mode of operation.

When the computer decides to control the intersection the HOL signal is generated. Relay KHOL3 and KADV2 are latched (FIG. 4). As discussed previously with reference to FIG. 8 the advance pulse is coupled to terminal X and when the KCHK3 relay is unlatched the pulse passes to terminal Y, thereafter causing a cam advance. In all intervals except intervals 7 and 16 this operation occurs. However, if the signal controller advances to phase A dwell interval 16, for example, the controller impresses an AC signal on terminal 65 which is coupled by way of rectifying diode CR46, resistor R57, the normally closed contact of relay KADV4 to one side of relay KCHK3, the other side of which is coupled via resistor R58 to ground. With relay KCHK3 latched its normally open contact closes and the advance pulse at terminal X is directed to timing circuit 60. At this time the KEXT relay is still latched and its normally open contact is closed. If there have been no detections on phase B via terminal 63 the KMRY relay is out, and just prior to the receipt of the advance pulse, a ground path is provided to one side of capacitor C36. This path extends from ground, through the normally closed contact of relay KCHK4, the normally closed contact of relay KMRY, diode CR47, the closed (normally open) contact of the KEXT relay to capacitor C36. If the advance pulse is a normal 400 millisecond pulse the voltage on the other side of capacitor C36 does not reach a high enough valve to overcome zener diode CR35. Thus, the KADV4 relay does not latch. Its contacts remain in their normal position, as shown, and the KCHK3 relay stays latched during the phase A dwell interval. The contacts of the KCHK3 relay keep the path between terminals X and Y open and the controller does not advance.

Advancement of the controller can occur by a number of different ways. For instance, if during the phase A dwell interval a phase B detection occurs, the KMRY relay latches and its normally closed contact opens. This action removes the ground on capacitor C36 and when the next advance pulse arrives the KADV4 relay quickly latches because no capacitor charge occurs. The latching of relay KADV4, opens its normally closed contact, interrupting power to relay KCHK3, closing the normally closed contact of relay KCHK3, and thereafter causing a cam advance.

The controller can also be forced out of the phase A dwell interval by issuing a force-off command, which is, in essence, an advance command extended for 800 milliseconds. The force-off pulse is coupled to timing circuit 60 and with capacitor C36 grounded (no phase B detections), the other side of capacitor C36 attains a sufficient voltage to overcome zener diode CR35 and latch relay KADV4. The circuit 60 is adjusted by potentiometer P1 so that relay KADV4 latches after about 600 milliseconds. Again, the latching of relay KADV4 causes relay KCHK3 to unlatch and the remainder of the advance pulse causes cam advance.

Another way to cause the controller to advance out of phase A dwell is by opening the remote recall switch SW2. Switch SW2 couples from the normally open contact of relay KEXT to the anode of diode CR47, and when opened, removes the ground on capacitor C36 and allows cam advance. In either of the foregoing situations the controller next moves through intervals 1-4 into the initial phase B green interval 5 (see FIG. 12). During interval 5, an AC signal coupled via terminal 68, latches relay KMRY2. This action, in turn, unlatches relay KMRY during that interval. The controller then steps to interval 6 and thence into phase B extension interval 7. At this time the KMRY relay may or may not be latched, but the KEXT relay has become unlatched. In the phase B extension interval the AC signal is applied to terminal 65 again and relay KCHK3 is latched.

At this time the controller wants to extend the extension interval 7 if detections continue to occur on phase B, and jump out of the interval into phase B clearance interval 8 if phase B detections occur but only with a long gap between vehicles, or if no phase B detections occur. If the vehicles continue to be detected on phase B, the computer can issue a force off command to move the controller out of interval 7.

If the KMRY relay does not latch there is no ground path provided for capacitor C36 because the KEXT contacts are in their normal position. In this position a path is provided via diode CR49, bu the path is interrupted by the open contacts of relay KMRY. When the advance pulse occurs timing circuit 60 quickly times out and the KADV4 relay latches. Relay KCHK3 unlatches and the cam advances, as discussed previously.

If a detection occurs on phase B, it is coupled via terminal 63 to latch relay KMRY. The normally open contact of relay KMRY close, and a ground path is now provided for timing capacitor C36. The path is from ground through the normally closed contacts of relays KCHK4 and KEXT, through the closed (normally open) contact of relay KMRY to capacitor C36. As long as the advance pulses are of 400 millisecond duration the KADV4 relay does not latch, and the controller stays in the extension interval. Also, each advance pulse latches the KCHK4 relay causing the KMRY relay to fall out but keeping the ground on capacitor C36. If the vehicles are spaced with a large gap therebetween the KMRY relay does not latch and thus the next advance pulse latches the KADV4 relay. If, after a set number of advance pulses without a cam advance the computer desires to advance out of the phase B extension interval, a force-off pulse is sent. The KADV4 relay latches, as discussed previously, and the advance occurs.

FIG. 9 also shows a check relay KCHK4. This relay operates in the same manner as the KCHK4 relay shown in FIG. 8. If a ground is provided for capacitor C36 when the advance pulse first commences in the dwell interval, KCHK4 relay locks in the ground through its own contacts so that the timing circuit can time out, regardless of what phase B detections may have occurred.

FULLY-ACTUATED SYSTEM

FIG. 10 is a block diagram similar to that shown in FIG. 7 for fully-actuated operation. The central station may be identical to that previously discussed with reference to FIGS. 2 and 7. The demand-respond units 25A and 25B may be identical to the unit shown in FIG. 9. The unit 25A, for example, is responsive to detections on phase A when the controller is in the phase B dwell interval, while the unit 25B is responsive to detections on phase B when the controller is in the phase A dwell interval. In addition, unit 25A is responsive to detections on phase A when the controller is in the phase A extension interval, while unit 25B is responsive to detections on phase B when the controller is in the phase B extension interval. Thus, if the controller is in phase A dwell, and a phase B detection occurs, the controller advances to phase B dwell as long as no detections occur on phase A. If detections are occurring with a predetermined gap between vehicles then phase A green is extended. After a set number of extension intervals the computer then issues a force-off command and the controller steps to the phase B dwell interval. If no detections occur on phase A the controller stays in phase B dwell. If detections do occur on phase A the controller sequences to the A extension interval. If the A extension interval is extended by vehicles then a computer force-off command may be issued to sequence the controller back to the phase B dwell interval. The cycle may then repeat.

In one system the controller positions are used in the following manner. Interval 3 is the phase A dwell, interval 6 the phase A extension, interval 12 the phase B dwell, and interval 14 the phase B extension. With reference to FIGS. 9 and 10, unit 25B would be enabled (at terminal 65) during interval 3 because the controller is in the phase A dwell interval and thus the system wants to look at the phase B detections. During intervals 6 and 12 the unit 25A is enabled (at terminal 65), and during interval 14 unit 25B is enabled. The demand-respond unit of FIG. 9 is actually unit 25B of FIG. 10 because it ties to the phase B detector. The unit 25A would have the same circuit configuration but the inputs from the controller would, of course, occur during different controller intervals. For example, in unit 25A, the phase A walk signal is coupled to terminal 68, and the phase B walk is coupled to terminal 67.

When using two demand-respond units, as shown in FIG. 10 one other connection has to be provided between units 25A and 25B over line 25C. This connection ties the normally closed contacts of the KCHK3 relays in each unit in series. Thus, the input from the slave unit at terminal X couples to terminal Y of unit 25A. A jumper then connects terminal Y of unit 25A and terminal X of unit 25B. Terminal Y of unit 25B couples back to the slave unit. When both KCHK3 relays are out normal cam advance occurs. When either KCHK3 relay latches its associated timing circuit 60 operates.

Figure 11:
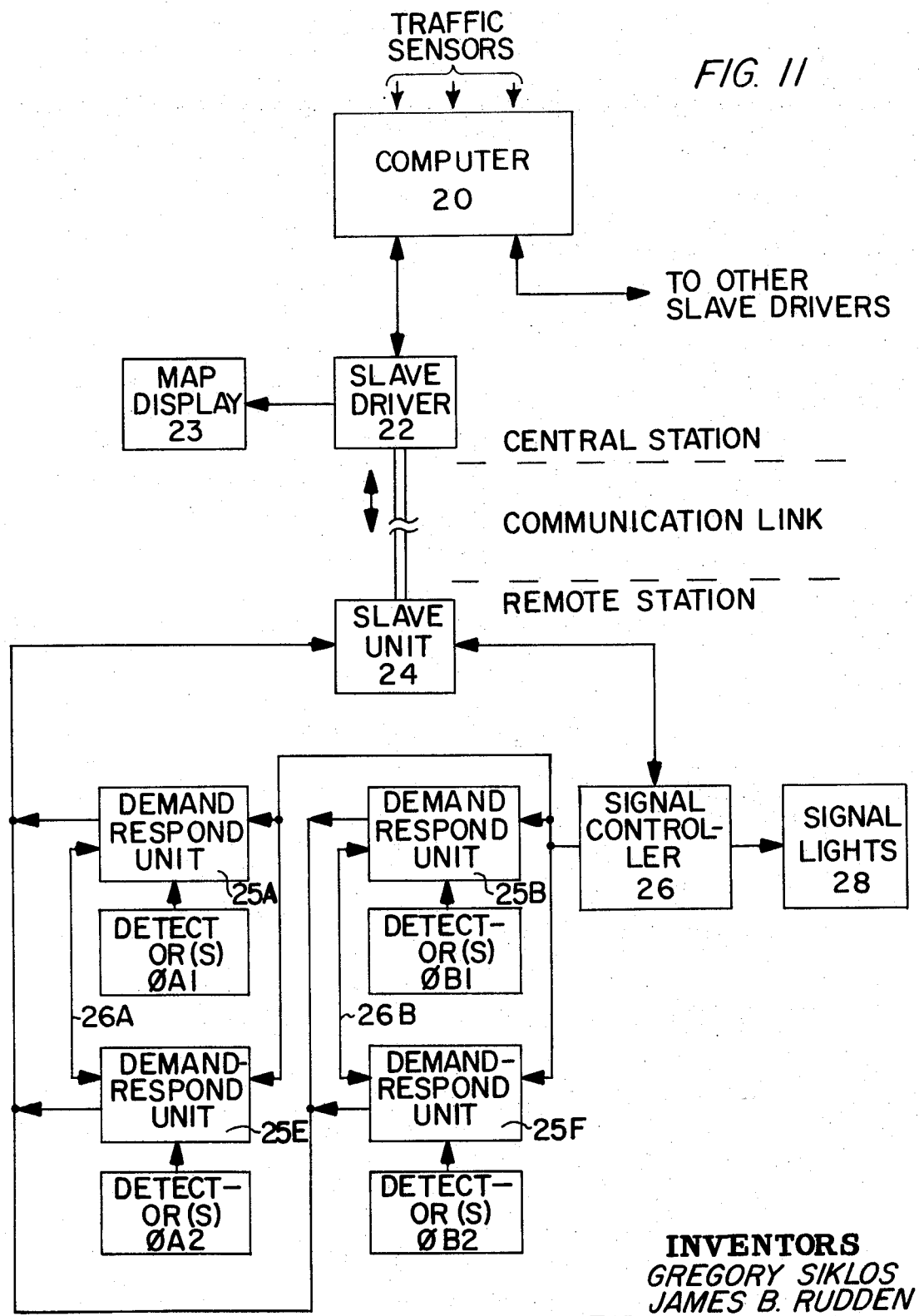
FIG. 11 is a block diagram of another embodiment of the invention.

FIG. 11 is a block diagram of a traffic control system wherein the remote station comprises four demand-respond units 25A, 25B, 25E and 25F. One or more detectors associated with phase A are coupled to each of the units 25A and 25E. Similarly, one or more detectors associated with phase B are coupled to each of the units 25B and 25F. Each of the units associated with one phase may be responsive to traffic flow in opposite directions. For example, in FIG. 1 unit 25A may connect to detector DA1 and unit 25E may connect to detector DA2. With the arrangement shown in FIG. 11 it is desirable to have the controller sequence out of the phase A extension interval, for example, only when no further detections occur on any phase A detector. Thus, the A extension interval would normally terminate only if no close detections occurred in either direction on phase A. The connections for providing such operation are schematically illustrated as lines 26A and 26B. Referring again to FIG. 9, the terminals 66 of units 25A and 25E are interconnected. Suppose that no detections are sent from detector DA1, then the KCHK3 relay wants to fall out and advance the controller. However, if detector DA2 is still sensing vehicles both KCHK3 relays (units 25A and 25E) are latched through the interconnecting line 26A. Only when the KADV4 relays of both units 25A and 25E latch can the controller advance out of this A extension interval. The same operation occurs with reference to the detectors DB1 and DB2 of phase B.

RESYNCHRONIZATION

The resynchronization of the dial occurs during remote operation. FIG. 5C shows the voltage pattern on the telephone line for this mode of operation. The circuitry of the slave driver of FIGS. 3A and 3B and the slave unit of FIG. 4 are effected by this mode of operation.

In FIG. 4 the terminal 46 couples to a dial key operated brake in the dial unit. Normally, when the controller is advancing under local control, for example, the KRES3 relay is out, its normally open contact is open and the dial operates without a constraint. During remote operation (see FIG. 5B) the dial output is disconnected and a positive voltage is impressed on the tip telephone lead as long as the KHOL relay is latched. When resynchronization starts the polarity on the tip lead goes negative (see FIG. 5C). A ground RES command from the computer latches relay KRES1 and its normally open contact closes. This action couples the negative 100 volt supply via resistors R7 and R14, and the closed (normally open) contact of relay KHOLI, to the tip telephone lead. This negative voltage is passed by diodes CR10 and CR12, and relay KRES2 latches. Capacitor C21 holds relay KADV2 in for a sufficient time after relay KRES2 latches, thus assuring that a false advance is not generated due to this polarity reversal.

In FIG. 4 when the KRES2 relay latches its normally open contact closes interrupting the path to terminal X. When the KADV2 relay falls out a path is provided from terminal V, through resistor R15, the normally closed contact of relay KADV2, the closed (normally open) contact of relay KRES2, diode CR70 and resistor R70 to relay KRES3. Relay KRES3 latches and the circuit including resistor R71, diode CR71 and capacitor 70 hold relay KRES3 latched for 2 seconds after the KRES2 relay falls out. Thus, as long as the KRES2 relay does not fall out for longer than 2 seconds the KRES3 relay stays latched. The AC signal from terminal V is also coupled via the contacts of relays KADV2 and KRES2, diode CR72, and resistor R22 to the KHOL3 relay. This holds the KHOL3 relay in during resynchronous operation thereby keeping the system in remote operation. During the advance (telephone line to ground) the KRES2 relay temporarily falls out and an advance pulse is generated via terminals V and X to cause the controller to step. The KRES3 relay, however, does not fall out as it is held in by the discharge current of capacitor C70. Under these conditions the AC voltage is coupled to terminal 46 and the dial if stopped, due to its being resynchronized, is not released. At the correct reset point (time zero or usually interval 1) the dial is released by dropping out the KRES1 relay and keeping the KHOLI relay latched (see FIG. 3B). The voltage on the tip lead goes negative to positive (see FIG. 5C). Relay KADV2 latches first followed by relay KRES2 falling out (see FIG. 4). Because the KADV2 relay latches first no advance pulse is passed to terminal X. However, the AC signal from terminal V is passed through the closed (normally open) contact of relay KADV2, resistor R75, diode CR75 to capacitor C70. Diode CR75 is poled to pass only the negative portion of the AC signal. This causes capacitor C70 to discharge quite rapidly, and relay KRES3 falls out. The AC path to terminal 46 opens and the dial is released without any erroneous cam advance. The end of the dial release (see FIG. 5C) occurs when the KRES1 relay is again latched (FIG. 3A) and the voltage on the tip lead goes positive to negative. The KRES2 relay latches first, then the KADV2 relay falls out, and relay KRES3 latches. The AC signal is again applied to terminal 46 and the dial may, if it is still out of step with time zero, again be stopped. Normally, however, once it is put in step its offset key will cross the KRES3 insert just as the telephone line polarity is reversed (time zero).

The present invention is to be construed as embracing each and every novel feature and novel combination of features present in or possessed by the apparatus herein disclosed and limited solely by the spirit and scope of the appended claims.

What is claimed is:

1. A traffic control system comprising:
   a central control station;
   at least one local station including a traffic signal controller for controlling the traffic intersection;
   a two wire communication line intercoupling the central control station and the local station;
   said central control station including circuit means for selectively impressing a first signal level on the communication line when the central station is conditioned to control the local station and a second signal level on the communication line for a predetermined duration when the central station is conditioned to advance the signal controller at the local station;
   said local station including circuit means responsive to said first signal level for selectively rendering said local station responsive to said second signal level and means thereafter responsive to said second signal level for advancing said signal controller;
   said local station also including means responsive to the advance of said signal controller for generating a status signal during said predetermined duration of the second signal indicative of advancement of the controller;
   said central control station including means for receiving said status signal over said two-wire communication line during said predetermined interval,
   wherein said local signal controller is adapted to control traffic flow on at least two streets associated with the intersection at least one vehicle detector being associated with at least one of the streets,
   said local station comprising detection responsive means intercoupled with said vehicle detector, the circuit means of the local station, and the local signal controller, and including a vehicle memory for storing a vehicle presence indication from said vehicle detector.

2. A traffic control system as set forth in claim 1 wherein said central control station includes a computer programmed to transmit control commands to said circuit means of said central control station.

3. A traffic control system as set forth in claim 1 wherein said detection responsive means comprises controller advance control means coupled to the means for advancing the signal controller and the vehicle memory for selectively inhibiting said means for advancing during at least a first interval of said signal controller when no vehicles have been detected by said vehicle detector thereby preventing controller advance out of the first interval.

4. A traffic control system as set forth in claim 3 wherein said detection response means also comprises timing circuit means coupled to said controller advance control means and adapted to receive said advance signal having a predetermined duration;
   said timing circuit means responsive to said advance signal and the presence of a vehicle presence indication for passing said advance signal to said means for advancing during the first interval.

5. A traffic control system as set forth in claim 4 wherein said timing circuit means is also responsive to said advance signal which occurs during the absence of a vehicle detection for blocking said advance signal and preventing the signal controller from advancing out of the first interval.

6. A traffic control system as set forth in claim 4 wherein said timing circuit means is also responsive to an extended advance signal generated at said central control station and which occurs during the absence of a vehicle detection for passing at least part of said extended advance signal to said means for advancing.

7. A traffic control system as set forth in claim 4 wherein said timing circuit means is also responsive during a vehicle extension interval associated with one phase of said signal controller to said advance signal and the continued indication of detected vehicles associated with another phase for blocking said advance signal and preventing the signal controller from advancing out of the extension interval.

8. A traffic control system as set forth in claim 7 wherein said timing circuit means is also responsive to said advance signal which occurs during the absence of detected vehicles over a predetermined time period for passing said advance signal to said means for advancing during the extension interval.

9. A traffic control system as set forth in claim 7 wherein said timing circuit means is responsive to an extended advance signal generated at said central control station during said extension interval associated with one phase and the continued indication of vehicle detections associated with another phase for passing at least part of said extended advance signal to said means for advancing.

10. A traffic control system comprising:
a central control station;
at least one local station including a traffic signal controller for controlling the traffic intersection;
a two-wire communication line intercoupling the central control station and the local station;
said central control station including circuit means for selectively impressing a first signal level on the communication line when the central station is conditioned to control the local station and a second signal level on the communication line for a predetermined duration when the central station is conditioned to advance the signal controller at the local station;
said local station including circuit means responsive to said first signal level for selectively rendering said local station responsive to said second signal level and means thereafter responsive to said second signal level for advancing said signal controller;
said local station also including means responsive to the advance of said signal controller for generating a status signal during said predetermined duration of the second signal indicative of advancement of the controller;
said central control station including means for receiving said status signal over said two-wire communication line during said predetermined interval,
wherein said local signal controller is adapted to control traffic flow on a main street and a cross street, at least one vehicle detector being associated with the main and cross streets respectively;
said local station comprising at least two detection responsive means, one coupled to the main street vehicle detector and the other coupled to the cross street detector, each said detection responsive means also coupled to the circuit means of the local station and the local signal controller and including a vehicle memory coupled to the vehicle detector for storing a vehicle demand indication.

11. A traffic control system as set forth in claim 10 wherein each said detection responsive means comprises controller advance control means coupled to the means for advancing and its vehicle memory, for selectively inhibiting said means for advancing during both a main street dwell interval of said signal controller when no vehicles have been detected by the cross street vehicle detector, and a cross street dwell interval of said signal control when no vehicles have been detected by the main street vehicle detectors, respectively.

12. A traffic control system as set forth in claim 11 wherein each of said controller advance control means selectively inhibits said means for advancing during both a main street extension interval when vehicles continue to be detected by the main street detector, and a cross street extension interval when vehicles continue to be detected by the cross street detector, respectively.

13. A traffic control system as set forth in claim 10 wherein at least two vehicle detectors are associated with the main street and the cross street respectively, and the local station comprises one detection responsive means coupled to each vehicle detector;
said local station including AND circuit means intercoupling the detection responsive means associated with one of the streets for permitting advancement out of the extension interval associated with that street only when vehicle indications associated with both vehicle detectors associated with that street terminate.

14. A traffic control system comprising:
a central control station;
at least one local station including a traffic signal controller for controlling the traffic intersection;
a two-wire communication line intercoupling the central control station and the local station;
said central control station including circuit means for selectively impressing a first signal level on the communication line when the central station is conditioned to control the local station and a second signal level on the communication line for a predetermined duration when the central station is conditioned to advance the signal controller at the local station;
said local station including circuit means responsive to said first signal level for selectively rendering said local station responsive to said second signal level and means thereafter responsive to said second signal level for advancing said signal controller;
said local station also including means responsive to the advance of said signal controller for generating a status signal during said predetermined duration of the second signal indicative of advancement of the controller;
said central control station including means for receiving said status signal over said two-wire communication line during said predetermined interval,
wherein said local station includes an enabling circuit coupled to said means for advancing the signal controller and operative during at least a second interval of operation of said signal controller during local control of said signal controller to permit the first signal level transmitted from said central control station over said communication line to control the local station thereby reverting the system from local to remote central control.

15. A traffic control system as set forth in claim 14 wherein said enabling circuit inhibits said first signal level during other intervals than said at least a second interval during local control of said signal controller thereby preventing the central station from controlling local operation.

16. A traffic control system comprising:
a central control station;
at least one local station including a traffic signal controller for controlling the traffic intersection;
a two-wire communication line intercoupling the central control station and the local station;
said central control station including circuit means for selectively impressing a first signal level on the communication line when the central station is conditioned to control the local station and a second signal level on the communication line for a predetermined duration when the central station is conditioned to advance the signal controller at the local station;
said local station including circuit means responsive to said first signal level for selectively rendering said local station responsive to said second signal level and means thereafter responsive to said second signal level for advancing said signal controller;
said local station also including means responsive to the advance of said signal controller for generating a status signal during said predetermined duration of the second signal indicative of advancement of the controller;
said central control station including means for receiving said status signal over said two-wire communication line during said predetermined interval,
said means for generating a status signal including means for generating a status signal of a first polarity during a first predetermined period and a status signal of a second polarity during a second successive predetermined period.

17. A traffic control system comprising:
a central control station;
at least one local station including a traffic signal controller for controlling the traffic intersection;
a two-wire communication line intercoupling the central control station and the local station;
said central control station including circuit means for selectively impressing a first signal level on the communication line when the central station is conditioned to control the local station and a second signal level on the communication line for a predetermined duration when the central station is conditioned to advance the signal controller at the local station;
said local station including circuit means responsive to said first signal level for selectively rendering said local station responsive to said second signal level and means thereafter responsive to said second signal level for advancing said signal controller;
said local station also including means responsive to the advance of said signal controller for generating a status signal during said predetermined duration of the second signal indicative of advancement of the controller;
said central control station including means for receiving said status signal over said two-wire communication line during said predetermined interval,
wherein the circuit means at said central control station is adapted to selectively impress a third signal level on the communication line when the central control station is conditioned to re-synchronize the timing at the local station.

18. A traffic control system as set forth in claim 1 wherein said local station includes means for preventing local signal controller advancement during the pendency of the third signal level thereby maintaining the signal controller under remote control during re-synchronization.

* * * * *